(12) United States Patent
Lee et al.

(10) Patent No.: US 11,470,108 B2
(45) Date of Patent: *Oct. 11, 2022

(54) DETECTION AND PREVENTION OF EXTERNAL FRAUD

(71) Applicant: Abnormal Security Corporation, San Francisco, CA (US)

(72) Inventors: Yu Zhou Lee, San Francisco, CA (US); Lawrence Stockton Moore, Palo Alto, CA (US); Jeshua Alexis Bratman, Brooklyn, NY (US); Lei Xu, New York, NY (US); Sanjay Jeyakumar, Berkeley, CA (US)

(73) Assignee: Abnormal Security Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/239,152

(22) Filed: Apr. 23, 2021

(65) Prior Publication Data

US 2021/0336983 A1 Oct. 28, 2021

Related U.S. Application Data

(60) Provisional application No. 63/014,421, filed on Apr. 23, 2020.

(51) Int. Cl.
*H04L 29/06* (2006.01)
*H04L 9/40* (2022.01)
(Continued)

(52) U.S. Cl.
CPC .......... *H04L 63/1433* (2013.01); *H04L 51/08* (2013.01); *H04L 51/212* (2022.05);
(Continued)

(58) Field of Classification Search
CPC ..... H04L 63/1433; H04L 51/08; H04L 51/12; H04L 63/0245; H04L 63/0236; H04L 63/126; H04L 63/145
(Continued)

(56) References Cited

U.S. PATENT DOCUMENTS 6,088,717 A 7/2000 Reed et al.
7,263,506 B2 8/2007 Lee
(Continued)

FOREIGN PATENT DOCUMENTS

CN 107315954 11/2017

OTHER PUBLICATIONS

Barngrover, Adam, "Vendor Access Management with IGA", Saviynt Inc. Apr. 24, 2019 (Apr. 24, 2019) Retrieved on Apr. 17, 2021 (Apr. 17, 2021) from <https://saviynt.com/vendor-access-management-with-iga/> entire document, 2 pp.
(Continued)

*Primary Examiner* — Evans Desrosiers
(74) *Attorney, Agent, or Firm* — Van Pelt, Yi & James LLP

(57) ABSTRACT

Introduced here are computer programs and computer-implemented techniques for detecting instances of external fraud by monitoring digital activities that are performed with accounts associated with an enterprise. A threat detection platform may determine the likelihood that an incoming email is indicative of external fraud based on the context and content of the incoming email. For example, to understand the risk posed by an incoming email, the threat detection platform may seek to determine not only whether the sender normally communicates with the recipient, but also whether the topic is one normally discussed by the sender and recipient. In this way, the threat detection platform can
(Continued)

establish whether the incoming email deviates from past emails exchanged between the sender and recipient.

21 Claims, 17 Drawing Sheets

(51) Int. Cl.
  *H04L 51/08* (2022.01)
  *H04L 51/212* (2022.01)
(52) U.S. Cl.
  CPC ...... *H04L 63/0236* (2013.01); *H04L 63/0245* (2013.01); *H04L 63/126* (2013.01); *H04L 63/145* (2013.01)
(58) Field of Classification Search
  USPC .......................................................... 726/25
  See application file for complete search history.

(56) References Cited

U.S. PATENT DOCUMENTS

| | | | |
|---|---|---|---|
| 7,451,487 | B2 | 11/2008 | Oliver |
| 7,610,344 | B2 | 10/2009 | Mehr |
| 7,953,814 | B1 | 5/2011 | Chasin |
| 8,566,938 | B1 | 10/2013 | Prakash |
| 8,819,819 | B1 | 8/2014 | Johnston |
| 8,935,788 | B1 | 1/2015 | Diao |
| 9,009,824 | B1 | 4/2015 | Chen |
| 9,154,514 | B1 | 10/2015 | Prakash |
| 9,213,827 | B2 | 12/2015 | Li |
| 9,245,115 | B1 | 1/2016 | Jakobsson |
| 9,264,418 | B1 | 2/2016 | Crosley |
| 9,348,981 | B1 | 5/2016 | Hearn |
| 9,473,437 | B1 | 10/2016 | Jakobsson |
| 9,516,053 | B1 | 12/2016 | Muddu |
| 9,537,880 | B1 | 1/2017 | Jones |
| 9,571,512 | B2 | 2/2017 | Ray |
| 9,686,308 | B1 | 6/2017 | Srivastava |
| 9,756,007 | B1 | 9/2017 | Stringhini |
| 9,774,626 | B1 | 9/2017 | Himler |
| 9,781,152 | B1 | 10/2017 | Mistratov |
| 9,847,973 | B1 | 12/2017 | Jakobsson |
| 9,961,096 | B1 | 5/2018 | Pierce |
| 9,967,268 | B1 | 5/2018 | Hewitt |
| 10,015,182 | B1 | 7/2018 | Shintre |
| 10,104,029 | B1* | 10/2018 | Chambers ............. H04L 51/212 |
| 10,129,194 | B1 | 11/2018 | Jakobsson |
| 10,129,288 | B1 | 11/2018 | Xie |
| 10,243,989 | B1 | 3/2019 | Ding |
| 10,250,624 | B2 | 4/2019 | Mixer |
| 10,277,628 | B1 | 4/2019 | Jakobsson |
| 10,362,057 | B1 | 7/2019 | Wu |
| 10,397,272 | B1 | 8/2019 | Bruss |
| 10,419,468 | B2 | 9/2019 | Glatfelter |
| 10,601,865 | B1 | 3/2020 | Mesdaq |
| 10,616,272 | B2 | 4/2020 | Chambers |
| 10,673,880 | B1 | 6/2020 | Pratt |
| 10,721,195 | B2 | 7/2020 | Jakobsson |
| 10,911,489 | B1 | 2/2021 | Chechik |
| 11,019,076 | B1 | 5/2021 | Jakobsson |
| 2002/0002520 | A1 | 1/2002 | Gatto |
| 2005/0187934 | A1 | 8/2005 | Motsinger |
| 2006/0253581 | A1 | 11/2006 | Dixon et al. |
| 2007/0074169 | A1 | 3/2007 | Chess |
| 2007/0276851 | A1 | 11/2007 | Friedlander |
| 2008/0086532 | A1 | 4/2008 | Cunningham |
| 2008/0114684 | A1* | 5/2008 | Foster .................... G06Q 30/06 705/51 |
| 2009/0037350 | A1 | 2/2009 | Rudat |
| 2009/0132490 | A1 | 5/2009 | Okraglik |
| 2010/0318614 | A1 | 12/2010 | Sager |
| 2011/0173142 | A1 | 7/2011 | Dasgupta |
| 2012/0028606 | A1 | 2/2012 | Bobotek |
| 2012/0110672 | A1 | 5/2012 | Judge |
| 2012/0278887 | A1 | 11/2012 | Krish |
| 2012/0290712 | A1 | 11/2012 | Walter |
| 2012/0297484 | A1 | 11/2012 | Srivastava |
| 2013/0041955 | A1 | 2/2013 | Chasin |
| 2014/0013441 | A1 | 1/2014 | Hencke |
| 2014/0032589 | A1 | 1/2014 | Styler et al. |
| 2014/0380478 | A1 | 12/2014 | Canning |
| 2015/0026027 | A1 | 1/2015 | Priess |
| 2015/0128274 | A1 | 5/2015 | Giokas |
| 2015/0143456 | A1 | 5/2015 | Raleigh et al. |
| 2015/0161609 | A1* | 6/2015 | Christner ........... G06Q 20/4016 705/44 |
| 2015/0228004 | A1 | 8/2015 | Bednarek |
| 2015/0234831 | A1 | 8/2015 | Prasanna Kumar |
| 2015/0237068 | A1 | 8/2015 | Sandke |
| 2015/0295942 | A1 | 10/2015 | Tao |
| 2015/0339477 | A1 | 11/2015 | Abrams |
| 2016/0014151 | A1 | 1/2016 | Prakash |
| 2016/0036829 | A1 | 2/2016 | Sadeh-Koniecpol |
| 2016/0057167 | A1 | 2/2016 | Bach |
| 2016/0156654 | A1 | 6/2016 | Chasin |
| 2016/0227367 | A1 | 8/2016 | Alsehly |
| 2016/0253598 | A1 | 9/2016 | Yamada |
| 2016/0262128 | A1 | 9/2016 | Hailpern |
| 2016/0321243 | A1 | 11/2016 | Walia |
| 2016/0328526 | A1 | 11/2016 | Park |
| 2016/0344770 | A1 | 11/2016 | Verma |
| 2017/0041296 | A1 | 2/2017 | Ford et al. |
| 2017/0048273 | A1 | 2/2017 | Bach |
| 2017/0098219 | A1 | 4/2017 | Peram |
| 2017/0111506 | A1 | 4/2017 | Strong |
| 2017/0186112 | A1 | 6/2017 | Polapala |
| 2017/0214701 | A1 | 7/2017 | Hasan |
| 2017/0223046 | A1 | 8/2017 | Singh |
| 2017/0230323 | A1* | 8/2017 | Jakobsson ........... H04L 63/1433 |
| 2017/0230403 | A1 | 8/2017 | Kennedy |
| 2017/0237776 | A1 | 8/2017 | Higbee |
| 2017/0251006 | A1 | 8/2017 | Larosa |
| 2017/0289191 | A1 | 10/2017 | Thioux |
| 2017/0346853 | A1 | 11/2017 | Wyatt |
| 2018/0027006 | A1 | 1/2018 | Zimmermann |
| 2018/0084003 | A1 | 3/2018 | Uriel |
| 2018/0084013 | A1 | 3/2018 | Dalton |
| 2018/0091453 | A1 | 3/2018 | Jakobsson |
| 2018/0091476 | A1 | 3/2018 | Jakobsson |
| 2018/0196942 | A1 | 7/2018 | Kashyap |
| 2018/0219888 | A1 | 8/2018 | Apostolopoulos |
| 2018/0227324 | A1 | 8/2018 | Chambers |
| 2018/0295146 | A1 | 10/2018 | Kovega |
| 2018/0324297 | A1 | 11/2018 | Kent |
| 2019/0014143 | A1 | 1/2019 | Syme |
| 2019/0026461 | A1 | 1/2019 | Cidon |
| 2019/0028509 | A1 | 1/2019 | Cidon |
| 2019/0052655 | A1 | 2/2019 | Benishti |
| 2019/0065748 | A1 | 2/2019 | Foster |
| 2019/0068616 | A1 | 2/2019 | Woods |
| 2019/0089711 | A1 | 3/2019 | Faulkner |
| 2019/0104154 | A1 | 4/2019 | Kumar |
| 2019/0109863 | A1 | 4/2019 | Traore |
| 2019/0141183 | A1 | 5/2019 | Chandrasekaran |
| 2019/0166161 | A1 | 5/2019 | Anand |
| 2019/0166162 | A1 | 5/2019 | Anand |
| 2019/0199745 | A1 | 6/2019 | Jakobsson |
| 2019/0205511 | A1 | 7/2019 | Zhan |
| 2019/0222606 | A1 | 7/2019 | Schweighauser |
| 2019/0238571 | A1 | 8/2019 | Adir |
| 2019/0311121 | A1 | 10/2019 | Martin |
| 2019/0319905 | A1 | 10/2019 | Baggett |
| 2019/0384911 | A1 | 12/2019 | Caspi |
| 2020/0007502 | A1 | 1/2020 | Everton |
| 2020/0021609 | A1 | 1/2020 | Kuppanna |
| 2020/0044851 | A1 | 2/2020 | Everson |
| 2020/0053111 | A1 | 2/2020 | Jakobsson |
| 2020/0076825 | A1 | 3/2020 | Vallur |
| 2020/0125725 | A1 | 4/2020 | Petersen |
| 2020/0162483 | A1 | 5/2020 | Farhady |
| 2020/0204572 | A1 | 6/2020 | Jeyakumar |
| 2020/0287936 | A1 | 9/2020 | Nguyen |
| 2020/0344251 | A1 | 10/2020 | Jeyakumar |

(56) References Cited

U.S. PATENT DOCUMENTS

| | | |
|---|---|---|
| 2020/0358804 A1 | 11/2020 | Crabtree |
| 2020/0374251 A1 | 11/2020 | Warshaw |
| 2020/0389486 A1 | 12/2020 | Jeyakumar |
| 2020/0396258 A1 | 12/2020 | Jeyakumar |
| 2021/0058395 A1 | 2/2021 | Jakobsson |
| 2021/0091962 A1 | 3/2021 | Finke |
| 2021/0092154 A1 | 3/2021 | Kumar |
| 2021/0168161 A1 | 6/2021 | Dunn |
| 2021/0240836 A1 | 8/2021 | Hazony |
| 2021/0272066 A1 | 9/2021 | Bratman |
| 2021/0295179 A1* | 9/2021 | Eyal Altman .......... G06N 20/00 |
| 2021/0329035 A1 | 10/2021 | Jeyakumar |
| 2021/0336983 A1 | 10/2021 | Lee |
| 2021/0360027 A1 | 11/2021 | Boyer |
| 2021/0374679 A1 | 12/2021 | Bratman |
| 2021/0374680 A1 | 12/2021 | Bratman |
| 2022/0021700 A1 | 1/2022 | Devlin |

OTHER PUBLICATIONS

International Search Report and Written Opinion dated Apr. 24, 2020 of PCT/US2019/067279 (14 pages).

Miahjajan, Sonal, et al., "Finding HTML Presentation Failures Using Image Comparison Techniques", ASE' 14, pp. 91-98 (Year: 2014).

Mont, Marco Casassa, "Towards accountable management of identity and privacy: Sticky policies and enforceable tracing services", 14th International Workshop on Database and Expert Systems Applications, 2003. Proceedings. IEEE, 2003. Mar. 19, 2003 (Mar. 19, 2003), Retrieved on Apr. 17, 2021 (Apr. 17, 2021) from <https://ieeexplore.ieee.org/abstract/documenV1232051> entire document, Mar. 19, 2003, 17 pp.

Proofpoint (Proofpoint Closed-Loop Email Analysis and Response, Aug. 2018, 2 pages) (Year: 2018).

* cited by examiner

400

401
Obtain an email that is addressed to a first email account associated with an enterprise 402
Establish that the email is representative of an instance of outreach by a second email account associated with a vendor for payment of an invoice 403
Access a database to identify a digital profile that is associated with the second email account 404
Obtain a metric that is indicative of the risk in communicating with the second email account 405
Determine, based on the metric, how to handle the email

501
Obtain an email that is addressed to a first email account associated with an enterprise 502
Establish that the email was sent with a second email account associated with a vendor by examining content of the email 503
Access a database to identify a digital profile that includes a record of past emails sent with the second email account 504
Determine, based on the digital profile, whether the email differs from the past emails in terms of context and/or content to such a degree that compromise of the second email account is likely 505
Determine how to handle the email based on the likelihood of compromise

FIGURE 5

Abnormal Cases    Threat Log    Abuse Mailbox    Dashboard

Orion Limited Invoice
13 days ago – October 23rd 2:46pm

Analysis Overview
Attack Score
94
Attack Type
Internal
Invoice Payment
Fraud
Analysis
Compromise
VIP
Wire Fraud
Attachment
Email Account Compromise Abnormal Security has blocked this as a possible Internal Invoice/Payment Fraud attack for the following reasons:

⚠ Behavior Analysis: Never-Before-Seen Vendor
Of the 1791 vendors we have seen delivering invoices by email, 0 match the name "Orion Limited".

⚠ Invoice Analysis: Suspicious Invoice Attached
Of the 3007 invoices we've seen delivered by email, 0 contain the bank name and routing number in the invoice, and 0 contain the metadata "Creator - _____ 0.12.2.1" (previously observed in fraudulent invoices from "invoice-generator.com").

⚠ Identity Analysis: Suspicious Mail Filters
Email sender account (_____@_____.com) has an unusual mail filter rules change. Mail filter rules changes are commonly associated with Email Account Compromise.

⚠ Possible Account Compromise
For "Renee West", we observed a too-fast-to-travel login from Hong Kong in the past 24 hours. Of the 776 read emails we've observed from "Renee West", 0 have come from Hong Kong.

Auto-Remediated
Email in Junk Folder (was in Inbox)
Restore to Inbox

2 Recipients Found
Number of recipients who received the same attack email
Show All Recipients Overview
Analysis Overview
Email Content Analysis
Content Analysis
Invoice Analysis •
Sender Identity Analysis •
Relationship Analysis
Detection Signals

FIGURE 6

Invoice Analysis

INVOICE

Vendor Name
Ⓑ Orion Limited  ( ! Never Before Seen )
Vendor

Vendor Email Address
N/A

Invoice Mailing Address
2659 Cottrill Lane, St. Louis, MO 63146

Invoice PO Number
201822945

Invoice Amount
$1120500

Bank Information
BANK XXX-XXXXXXX1-111  ( ! Never Before Seen )

Templatized Invoice?
Yes

Invoice Language
English

Overview
Analysis Overview
Email Content

Analysis
Content Analysis
Invoice Analysis •
Sender Identity Analysis •
Relationship Analysis
Detection Signals

FIGURE 7

Abnormal Cases   Threat Log   Abuse Mailbox   Dashboard

Potential Vendor Takeover: Prolia Systems
First Observed: 9 months ago - February 1st 8:33am Case Status [ ]

Abnormal Insights

| Unusual Sender Geolocation | Email from known vendor Prolia Systems originated from The Netherlands, where vendor Prolia Systems usually sends from the United States of America. |
| Unusual Reply-To Address | Of the 1341 emails previously observed from known vendor Prolia Systems, 0 contain the reply-to address "lucia@pro-lia-systems.com" |
| Atypical Financial Request | The email appears to be a financial request ("requesting a change of payment information") from Prolia Systems with atypical geographic original and reply-to address. This is uncommon for legitimate financial requests but common for vendor compromises. |

Vendor(s) Involved

Prolia Systems
Vendor
⚠ Abnormal Security has observed suspicious emails from this vendor.

Location: NJ, USA
Known Email Addresses: Lucia Foreman (luciaforeman@proliasystems.com)
collections@proliasystems.com
Primary Point(s) of Contact: Lucia Foreman (luciaforeman@proliasystems.com)
Past Invoices: 15

Employee(s) Involved

Renee West
Sr VP Treasury, Finance Department
Email: renee.west@amronba.com
Location: San Francisco, California View Profile

Case Timeline (Feb 1st)

8:33 AM • Email Correspondence
Lucia Foreman (luciaforeman@proliasystems.com) sent an email to Renee West titled 'Payment Status'.

8:58 AM • Email Correspondence
Renee West sent an email to Lucia Foreman (luciaforeman@proliasystems.com) title 'Re: Payment Status'.

FIGURE 8

Prolia Systems

Vendor Profile    Vendor Entity

Prolia Systems Vendor
Known Domains    https://proliasystems.com
Vendor Location    San Francisco, USA
                    Berlin, Germany
Business Category    [Construction] [Manufacturing]

Vendor Insights    Derived from Vendor DB

Vendor Contacts    jessica@proliasystem.com
                   alexander@proliasystem.com
                   lucia@proliasystem.com
Internal Contacts    Josh Waters, Renee West,
Contact Departments    Accounts Payable
Last Contacted    10 days ago – 2/24
Contact Frequency    Monthly
Invoice Involved?    Yes
Last Invoice Received    24 days ago – 2/10

High

Last 30 days    ⚠ Report Vendor

⚠ Vendor Currently Compromised
2 sources reported Prolia Systems' email is currently compromised from VendorBase.

⚠ Vendor Impersonation Attacks
5 vendor impersonation attacks were detected within Enterprise Co. Over 2897 vendor impersonation attacks were observed across VendorBase.

⚠ Recent Suspicious Activities
Last observed incident occurred 2 hours ago, within Enterprise Co.

Vendor Signal x Emails Message Table

Activity

Feb 3rd

10:01 AM    ⚠ Vendor Compromise Reported by Enterprise Co.
            2019-02-03 10:01:10 PST
            Compromised Domain    lucia.forman@proliasystem.com
            Compromised IP    104.41.11.1
            IP Geolocation    The Netherlands 8:49 AM    ⚠ Vendor Compromise Detected
           2019-02-03 08:49:08 PST 7:32 AM    ◯ 2 Vendor Compromises Reported by Abnormal Community
           2019-02-03 07:32:22 PST
           Compromised Domain    lucia.forman@proliasystem.com
           Compromised IP    104.41.11.1
           IP Geolocation    The Netherlands Feb 1st

FIGURE 11

ABNORMAL SECURITY

Hello Security Operations Team,

Abnormal Security detected a possible vendor compromise case between {insert vendor name} and {insert employee name}.

Review email in Portal
https://portal.abnormalsecurity.com/*

Details
Affected user: {insert employee email address}
Affected vendor: {insert vendor name}
First observed time: {insert time stamp}

Email Insights:

- {insert insights from email details page}

Abnormal Security Team
support@abnormalsecurity.com

Why are you receiving this message?
Your organization has enlisted Abnormal Security to help protect against email attacks. As part of our active protection suite, we send timely alerts to the security team as soon as we notice suspicious email activity. If you no longer wish to receive this type of notification, please reply with "Unsubscribe" to support@abnormalsecurity.com

FIGURE 12

| Vendor Entities | Vendor Risk Score | Per company vendor information derived from Vendor DB | | | | Vendor Signal |
|---|---|---|---|---|---|---|
| VendorBase [PREVIEW] | | | | | | + Add Vendor |
| Vendor Name | Risk Level | Vendor Contact | Company Contact(s) | Last Contacted | | Analysis |
| Prolia Systems | 9/10 | 3 Contacts | 2 Contacts | 10 Days Ago Feb 24 2:49 PM | | ⚠ Recent Compromise ⚠ Recent Spoofing |
| Becker Group | 3/10 | 1 Contact | 1 Contact | 11 Days Ago Feb 23 8:04 AM | | |
| Stanton Group | 7/10 | 2 Contacts | 1 Contact | A Month Ago Jan 29 11:00 AM | | ⚠ Recent Compromise |
| Bartell Management | 8/10 | 1 Contact | 1 Contact | 22 Days Ago Feb 12 12:47 PM | | ⚠ Recent Spoofing |
| Greenfelder LLC | 4/10 | 4 Contacts | 2 Contacts | 14 Days Ago Feb 20 11:27 PM | | ⚠ Recent Spoofing ⚠ Recent Phishing Campaign |
| Blick Staffing | 5/10 | 3 Contacts | 1 Contact | 2 Months Ago Jan 4 4:09 PM | | ⚠ Recent Phishing Campaign |
| Harris, Mills and Lockman | 4/10 | 1 Contact | 2 Contacts | 10 Days Ago Feb 24 8:04 PM | | ⚠ Recent Phishing Campaign |
| Bruen-Lesch | 6/10 | 1 Contact | 1 Contact | A Month Ago Feb 1 10:01 PM | | ⚠ Recent Spoofing |
| Mohr Auto Group | 5/10 | 1 Contact | 1 Contact | A Month Ago Jan 25 1:49 PM | | ⚠ Recent Phishing Campaign |
| Towne Inc | 6/10 | 2 Contacts | 1 Contact | 10 Days Ago Feb 24 12:19 AM | | ⚠ Recent Spoofing |

FIGURE 13

DETECTION AND PREVENTION OF EXTERNAL FRAUD

CROSS-REFERENCE TO RELATED APPLICATIONS

This application claims priority to U.S. Provisional Application No. 63/014,421, titled "Detection and Prevention of Vendor Fraud" and filed on Apr. 23, 2020, which is incorporated by reference herein in its entirety.

TECHNICAL FIELD

Various embodiments concern computer programs and associated computer-implemented techniques for detecting instances of external fraud through analysis of emails addressed to employees of enterprises.

BACKGROUND

Email has become vastly more sophisticated with the Internet connecting millions of individuals in real time. These advancements in connectivity have incentivized cyber actors (also referred to as "attackers") to send malicious emails in greater numbers than ever before. Because email represents the primary communication channel for most enterprises (also referred to as "companies" or "organizations"), it is a primary point of entry for attackers.

BRIEF DESCRIPTION OF THE DRAWINGS

FIG. 4 includes a flow diagram of a process for detecting instances of external fraud through analysis of emails addressed to employees of an enterprise.

FIG. 5 includes a flow diagram of a process for determining whether an incoming email is indicative of external fraud based on its context and content.

FIG. 6 includes an example of an interface with a threat log for an invoice.

FIG. 7 includes an example of an interface with an invoice analysis.

FIG. 8 includes an example of an interface on which information regarding a potential instance of vendor account compromise (also referred to as "vendor takeover") is presented.

FIG. 11 includes an interface with another visual representation of a profile for a vendor in a vendor database.

FIG. 12 includes an example of a notification that may be presented to an individual for review responsive to a determination that a vendor has been compromised or impersonated.

FIG. 13 includes an example of an interface with a list view of the profiles in a federated database.

Figure 1:
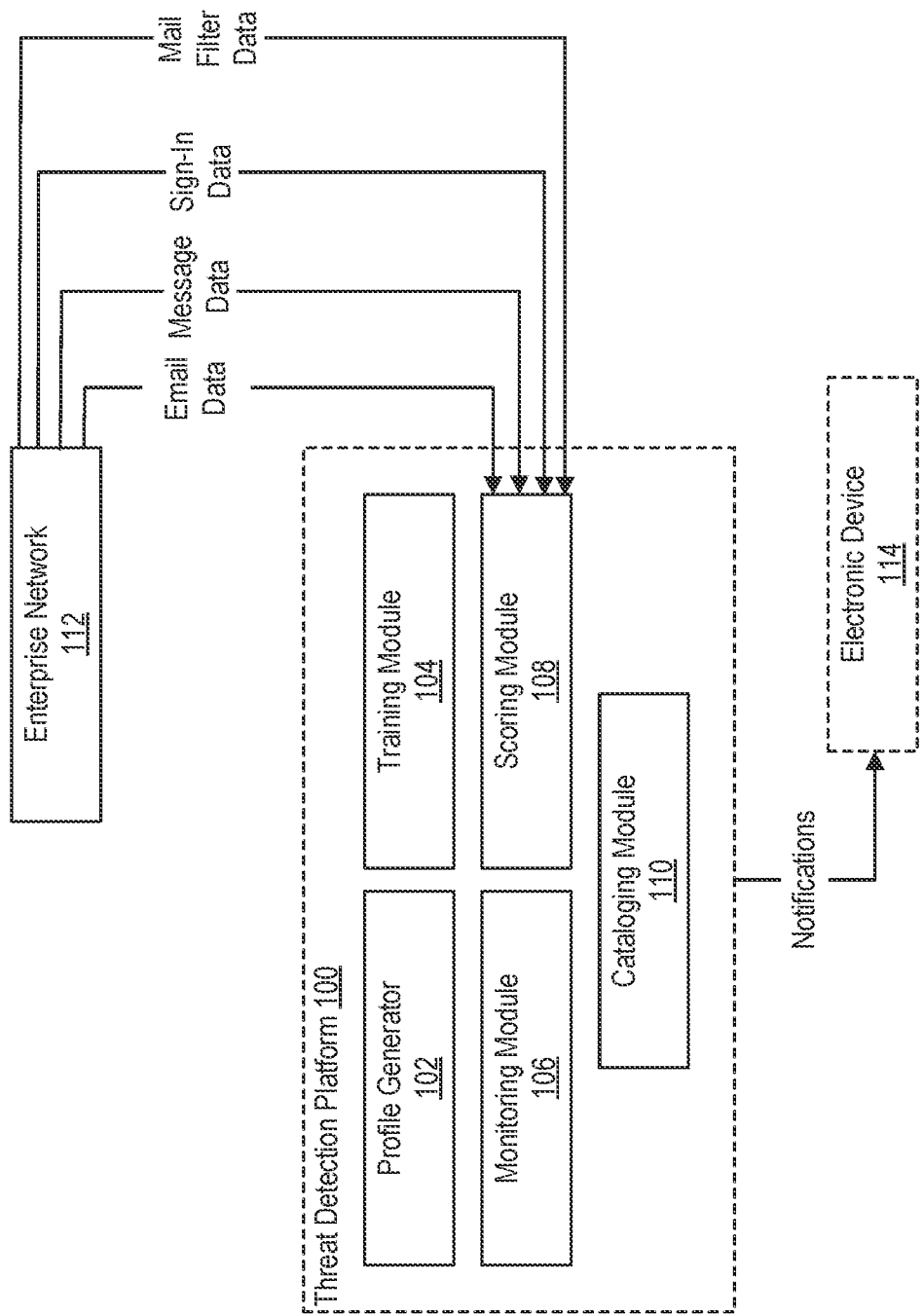
FIG. 1 depicts an example of a threat detection platform that is able to inspect emails to discover indicators of compromise (IOCs).

Various features of the technologies described herein will become more apparent to those skilled in the art from a study of the Detailed Description in conjunction with the drawings. Embodiments are illustrated by way of example and not limitation in the drawings. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

When engaging with vendors, enterprises face the threat of financial damage from two different categories of attacks, external fraud and internal fraud.

External fraud (also referred to as "vendor fraud") refers to situations where (i) an account associated with a vendor has been compromised and is used to perpetuate an attack or (ii) an attacker uses an account intended to impersonate a vendor to perpetuate an attack. For example, an attacker may use a compromised account associated with a vendor to send a fake invoice to an enterprise that includes fake wiring information, or an attacker may use an account intended to impersonate a vendor to send a fake invoice to an enterprise that includes fake wiring information. External fraud is problematic since the targets (e.g., employees of an enterprise) can be tricked into believing that they are dealing with a legitimate vendor.

Internal fraud refers to situations where an account associated with an enterprise is used to perpetuate an attack. For example, a compromise account associated with an employee of an enterprise may provide fake wiring information to a finance department in an effort to exfiltrate funds. Internal fraud can be difficult to detect since the attacks originate from accounts associated with the enterprise. Further information on discovering instances of internal fraud can be found in U.S. application Ser. No. 17/094,801, titled "Discovering Email Account Compromise Through Assessments of Digital Activities," which is incorporated herein by reference in its entirety.

For convenience, accounts associated with vendors may be referred to as "vendor accounts," and accounts associated with enterprises may be referred to as "enterprise accounts" or "employee accounts."

Within the above-mentioned categories, there are various types of attacks:

An attacker who has gained access to a vendor account may send fake invoices to various enterprises via email. These invoices are usually small (e.g., less than $10,000), and the emails will arrive from the actual vendor (e.g., passing protocols such as those defined by the Sender Policy Framework (SPF), DomainKeys Identified Mail (DKIM), and Domain-Based Message Authentication, Reporting, and Conformance (DMARC) protocols). Since the fake invoices are small, minimal diligence may be done by the enterprises and some payments may be made to the attacker.

An attacker who has gained access to an enterprise account may utilize the sensitive information to which she has access. Assume, for example, that the attacker gains access to an account associated with an employee who works in the accounting department of an enterprise. The attacker may exploit financial details to request payments. This can be accomplished by sending fake invoices or updating account information maintained by the enterprise to a bank account controlled by the attacker.

An attacker may set up a domain that is similar to a vendor. Said another way, the attacker may create a "lookalike domain" in an effort to trick a target into believing that she is interacting with the vendor. For example, if CompanyABC.com is the legitimate domain of a vendor, the attacker may set up a comparable domain (e.g., Company-ABC.com, CompanyABC.co, or CompanyABC.net) and then pretend to be the vendor. From this illegitimate domain, the attacker may send fake invoices or requests to update account information.

Upon gaining access to a vendor or enterprise account, an attacker may deploy a forwarding rule so that incoming emails are automatically forwarded to an external attacker-controlled account. Moreover, the attacker may set up a spoofed domain. This allows the attacker to be aware of payment conversations even if the credentials for the compromised account are changed. Accordingly, while the attacker may only have access to the compromised account for several hours or days, the knowledge gained from the forwarded emails can be used to exploit other enterprises using the spoofed domain.

An attacker who has gained access to an enterprise account associated with an important employee may utilize that account to initiate payments. For example, if the attacker gains access to an enterprise account associated with an executive-level manager, the attacker may send emails to the accounting department to make payments. The pretext of these attacks is normally that there is an urgent transaction requiring immediate action, and the targets may not suspect fraud since these attacks originate from a legitimate enterprise account.

An attacker could also impersonate a customer with which an enterprise already has a pre-existing relationship. For example, while impersonating a customer, an attacker may request equipment or material. In such a scenario, the costs of these purchases may be assigned to the customer while the attacker escapes with valuable merchandise.

Traditionally, enterprises have protected themselves against email-based campaigns by employing various defenses. For example, an enterprise may employ a filter that quarantines malicious emails, a whitelist that identifies non-malicious domains, a blacklist that identifies malicious domains, or an identification scheme that causes internal emails to be visually distinguishable from external emails. These conventional defenses are largely ineffective against some email-based campaigns, however. For example, many instances of external fraud are unlikely to be discovered because the threats originate from vendor accounts that have been compromised. Because those accounts are legitimate, malicious emails originating therefrom will proceed through security products—like filters, whitelists, and blacklists—without issue.

Introduced here are computer programs and computer-implemented techniques for detecting instances of external fraud by monitoring digital activities that are performed with accounts associated with an enterprise. As further discussed, a threat detection platform (or simply "platform") may determine the likelihood that an incoming email is indicative of external fraud based on the context and content of the incoming email. For example, to understand the risk posed by an incoming email, the threat detection platform may seek to determine not only whether the sender normally communicates with the recipient, but also whether the topic is one normally discussed by the sender and recipient. In this way, the threat detection platform can establish whether the incoming email deviates from past emails exchanged between the sender and recipient.

Embodiments may be described in the context of computer-executable instructions for the purpose of illustration. However, aspects of the technology can be implemented via hardware, firmware, or software. As an example, a set of algorithms representative of a computer-implemented model (or simply "model") may be applied to an email addressed to an employee of an enterprise in order to extract or derive information regarding its source. Upon determining that the email was sent with an account associated with a vendor, the threat detection platform can access a digital profile for the vendor. The threat detection platform can then determine, based on the digital profile, how to handle the email. For example, the threat detection platform may produce a metric that indicates the likelihood that the account is compromised based on a comparison of the email to past emails sent by the vendor to (i) the employee, (ii) other employees of the enterprise, or (iii) employees of other enterprises that utilize the threat detection platform.

Terminology

References in the present disclosure to "an embodiment" or "some embodiments" mean that the feature, function, structure, or characteristic being described is included in at least one embodiment. Occurrences of such phrases do not necessarily refer to the same embodiment, nor are they necessarily referring to alternative embodiments that are mutually exclusive of one another.

The terms "comprise," "comprising," and "comprised of" are to be construed in an inclusive sense rather than an exclusive sense (i.e., in the sense of "including but not limited to"). The term "based on" is also to be construed in an inclusive sense rather than an exclusive sense. Thus, unless otherwise noted, the term "based on" is intended to mean "based at least in part on."

The terms "connected," "coupled," and variants thereof are intended to include any connection or coupling between two or more elements, either direct or indirect. The connection/coupling can be physical, logical, or a combination thereof. For example, elements may be electrically or communicatively coupled to one another despite not sharing a physical connection.

The term "module" may refer broadly to software, firmware, and/or hardware. Modules are typically functional components that generate one or more outputs based on one or more inputs. A computer program may include or utilize one or more modules. Thus, a computer program may utilize multiple modules that are responsible for completing different tasks or a single module that is responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Overview of Threat Detection Platform

One of the key steps in preventing external and internal fraud is discovering compromised accounts. For the purpose of illustration, embodiments are described in the context of preventing external fraud through the creation and implementation of digital profiles (or simply "profiles") in a federated database. However, those skilled in the art will recognize that the features are similarly applicable to discovering, assessing, and cataloging instances of vendor impersonation. Thus, if a threat detection platform discovers that a vendor is being impersonated in an email, then the threat detection platform can quantify the risk accordingly. For example, the threat detection platform may store the email in a profile associated with the vendor, as well as increase a score that quantifies a risk in interacting with the vendor.

FIG. 1 depicts an example of a threat detection platform 100 that is able to inspect emails to discover indicators of compromise (IOCs). This approach allows the threat detection platform 100 to detect emails that originate from legitimate accounts but represent threats to the security of an enterprise. The threat detection platform 100 may include a profile generator 102, training module 104, monitoring module 106, scoring module 108, and cataloging module 110. Some embodiments of the threat detection platform 100 include a subset of these components, while other embodiments of the threat detection platform 100 include additional components that are not shown in FIG. 1.

At a high level, the threat detection platform 100 can acquire data related to the digital conduct of accounts associated with employees and then determine, based on an analysis of the data, how to handle threats in a targeted manner. The term "account" may refer to digital profiles with which employees can engage in digital activities. These digital profiles are normally used to perform activities such as exchanging emails and messages, and thus may also be referred to as "email accounts" or "messaging accounts." The term "digital conduct," meanwhile, may refer to the digital activities that are performed with those accounts. Examples of digital activities include transmitting and receiving digital communications; creating, modifying, and deleting filters to be applied to incoming digital communications; initiating sign-in activities; and the like. Examples of digital communications include emails and messages.

As shown in FIG. 1, the data may include information related to emails, messages, mail filters, and sign-in activities. Note that these data are not necessarily obtained from the same source. As an example, data related to emails may be acquired from an email service (e.g., Microsoft Exchange™) while data related to messages may be acquired from a messaging service (e.g., Slack®). Thus, the threat detection platform 100 may be able to identify threats based on an analysis of emails (e.g., the content of the body, the email address of the sender, etc.), metadata accompanying the emails (e.g., information regarding the sender, recipient, origin, time of transmission, etc.), and other suitable data.

The threat detection platform 100 can be implemented, partially or entirely, within an enterprise network 112, a remote computing environment (e.g., through which data regarding digital conduct is routed for analysis), a gateway, or another suitable location. The remote computing environment can belong to, or be managed by, the enterprise or another entity. In some embodiments, the threat detection platform 100 is integrated into the enterprise's email system (e.g., at the gateway) as part of an inline deployment. In other embodiments, the threat detection platform 100 is integrated into the enterprise's email system via an application programming interface (API) such as the Microsoft Outlook® API. In such embodiments, the threat detection platform 100 may obtain data via the API. Thus, the threat detection platform 100 can supplement and/or supplant other security products employed by the enterprise.

In a first variation, the threat detection platform 100 is maintained by a threat service (also referred to as a "security service") that has access to multiple enterprises' data. In this variation, the threat detection platform 100 can route data that is, for example, related to incoming emails to a computing environment managed by the security service. The computing environment may be an instance on Amazon Web Services® (AWS). The threat detection platform 100 may maintain one or more databases for each enterprise that include, for example, organizational charts, attribute baselines, communication patterns, and the like. Moreover, as further discussed below, the threat detection platform 100 may maintain federated databases that are shared amongst multiple entities. One example of a federated database is one that specifies vendors who have been deemed fraudulent or compromised. Other examples of federated databases include databases specifying individuals who have been deemed fraudulent or compromised, domains from which incoming emails determined to represent security threats originated, and the like. The security service may maintain different instances of the threat detection platform 100 for different enterprises, or the security service may maintain a single instance of the threat detection platform 100 for multiple enterprises. The data hosted in these instances can be obfuscated, encrypted, hashed, depersonalized (e.g., by removing personal identifying information), or otherwise secured or secreted. Accordingly, each instance of the threat detection platform 100 may only be able to access/process data related to the accounts associated with the corresponding enterprise(s).

In a second variation, the threat detection platform 100 is maintained by the enterprise whose accounts are being monitored, either remotely or on premises. In this variation, all relevant data may be hosted by the enterprise itself, and any information to be shared across multiple enterprises can be transmitted to a computing system that is maintained by the security service or a third party. For example, the threat detection platform 100 may transmit information regarding vendors that have been deemed fraudulent or compromised to a computing system that is maintained by the security service, and the computing system may populate this information into digital profiles associated with the vendors that are included in a federated database.

As shown in FIG. 1, the profile generator 102, training module 104, monitoring module 106, scoring module 108, and cataloging module 110 can be integral parts of the threat detection platform 100. Alternatively, these components could be implemented individually while operating "alongside" the threat detection platform 100. For example, the cataloging module 110 may be implemented in a remote computing environment to which the threat detection platform 100 is communicatively connected across a network. As mentioned above, the threat detection platform 100 may be implemented by a security service on behalf of an enterprise or the enterprise itself. In some embodiments, aspects of the threat detection platform 100 are enabled by a web-accessible computer program operating on a computer server or a distributed computing system. For example, an individual may be able to interface with the threat detection platform 100 through a web browser that is executing on a computing device (also referred to as an "electronic device").

The enterprise network 112 may be a mobile network, wired network, wireless network, or some other communication network maintained by the enterprise or an operator on behalf of the enterprise. The enterprise may utilize a security service to examine emails (among other things) to discover potential threats. The enterprise may grant permission to the security service to monitor the enterprise network 112 by examining emails (e.g., incoming emails or outgoing emails) and then addressing those emails that represent threats. For example, the threat detection platform 100 may be permitted to remediate the threats posed by those emails, or the threat detection platform 100 may be permitted to surface notifications regarding the threats posed by those emails.

In some embodiments, the enterprise further grants permission to the security service to obtain data regarding digital activities of the enterprise (and, more specifically, employees of the enterprise) in order to build profiles that specify communication patterns, behavioral traits, normal content of emails, etc. For example, the threat detection platform 100 may examine the emails received by employees of an enterprise from a given vendor in order to build a profile that can be used to infer whether significant variations in behavior of the given vendor have occurred. As another example, the threat detection platform 100 may examine the emails received by a given employee of an enterprise in order to build a profile that can be used to infer whether communication with a given vendor is unusual. Accordingly, the threat detection platform 100 could generate profiles for employees of the enterprise whose digital activities are under examination, as well as profiles for individuals or entities (e.g., vendors) with which the enterprise interacts.

The threat detection platform 100 may manage one or more databases in which data can be stored. Examples of such data include enterprise data (e.g., email data, message data, sign-in data, and mail filter data), remediation policies, communication patterns, behavioral traits, and the like. The data stored in the database(s) may be determined by the threat detection platform 100 (e.g., learned from data available on the enterprise network 112), provided by the enterprise, or retrieved from an external database (e.g., associated with LinkedIn®, Microsoft Office 365®, or G Suite™). The threat detection platform 100 may also store outputs produced by the various modules, including machine- and human-readable information regarding insights into threats and any remediation actions that were taken.

As shown in FIG. 1, the threat detection platform 100 may include a profile generator 102 that is responsible for generating one or more profiles for the enterprise. For example, the profile generator 102 may generate a separate profile for each account associated with an employee of the enterprise based on the sign-in data, message data, email data, or mail filter data. Profiles could also be generated for business groups, organizational groups, or the enterprise as a whole. As mentioned above, the profile generator 102 may also be able to generate profiles for individuals or entities that are external to the enterprise. For example, the profile generator 102 may be responsible for generating a profile for each vendor with which employees of the enterprise interact. Normally, this profile is based on the content and characteristics of incoming emails originating from accounts that are associated with the vendor, though this profile could also be based on the content and characteristics of outgoing emails addressed to accounts that are associated with the vendor. Similarly, the profile generator 102 could generate a profile for each vendor account with which employees of the enterprise interact as further discussed below.

By examining the data obtained from the enterprise network 112, the profile generator 102 can discover organizational information (e.g., employees, titles, and hierarchy), behavioral traits (e.g., based on historical emails, messages, and historical mail filters), normal content of incoming and outgoing emails, behavioral patterns (e.g., when each employee normally logs in), communication patterns (e.g., who each employee communicates with internally and externally, when each employee normally communicates, the employees with which a vendor communicates), etc. This information can be populated into profiles so that each profile can be used as a baseline for what constitutes normal activity by the corresponding account (or group of accounts).

A profile could include a number of behavioral traits associated with the corresponding account. For example, the profile generator 102 may determine the behavioral traits based on the email data, message data, sign-in data, or mail filter data obtained from the enterprise network 112. The email data may include information on the senders of past emails received by a given email account, content of those past emails, frequency of those past emails, temporal patterns of those past emails, topics of those past emails, geographical locations from which those past emails originated, formatting characteristics (e.g., usage of HTML, fonts, styles, etc.), and more. Thus, the profile generator 102 may attempt to build a profile for each email account that represents a model of normal behavior of the corresponding employee. As further discussed below, the profiles may be helpful in identifying communications that indicate a threat to the security of the enterprise may exist.

The monitoring module 106 may be responsible for monitoring communications (e.g., messages and emails) handled by the enterprise network 112. These communications may include inbound emails (e.g., external and internal emails) received by accounts associated with employees of the enterprise, outbound emails (e.g., external and internal emails) transmitted by those accounts, and messages exchanged between those accounts. In some embodiments, the monitoring module 106 is able to monitor inbound emails in near real time so that appropriate action can be taken if a malicious email is discovered. For example, if an inbound email is found to originate from an account associated with a vendor that is determined to be compromised (e.g., based on an output produced by the scoring module 108), then the inbound email may be at least temporarily prevented from reaching its intended destination by the monitoring module 106. In some embodiments, the monitoring module 106 is able to monitor communications only upon the threat detection platform 100 being granted permission by the enterprise (and thus given access to the enterprise network 112).

The scoring module 108 may be responsible for examining digital activities and communications to determine the likelihood that a security threat exists. For example, the scoring module 108 may examine incoming emails that are addressed to employees of an enterprise in order to identify those emails that originate from accounts associated with vendors. These emails may be representative of instances of outreach by the vendors. For each incoming email that is representative of an instance of outreach by a vendor, the scoring module 108 may produce a metric that is indicative of risk. The metric can be produced in various ways. For example, the scoring module 108 may examine each incoming email to determine how its characteristics compare to past emails received from the same vendor. In such embodiments, the scoring module 108 may determine whether characteristics such as timing, formatting, recipient, topic, and location of origination (e.g., in terms of sender email address or geographical location) match a pattern of past emails from the vendor that have been determined to be non-malicious. For instance, the scoring module 108 may determine that the likelihood of vendor account compromise is high if the email includes a request for reimbursement and originates from an unusual location (e.g., where the vendor has no presence).

The scoring module 108 can make use of heuristics, rules, neural networks, or other trained machine learning (ML) algorithms such as those based on deep learning, decision trees (e.g., gradient-boosted decision trees), logistic regression, and linear regression. Accordingly, the scoring module 108 may output discrete outputs or continuous outputs, such as a probability metric (e.g., specifying the likelihood that an incoming email is malicious), a binary output (e.g., malicious or non-malicious), or a classification (e.g., specifying the type of malicious email).

The cataloging module 110 (also referred to as a "recording module" or "profiling module") may be responsible for recording information regarding vendors that is gleaned by the other modules of the threat detection platform. For example, the cataloging module 110 may obtain a profile created for a vendor or vendor account by the profile generator 102, populate the profile with any outputs produced by the scoring module 108, and then store the profile in a data structure. This data structure may be representative of a federated database of vendors' compromise records. As mentioned above, the federated database could also include vendors' impersonation records. As another example, the cataloging module 110 may be responsible for reporting insights derived from the outputs produced by the scoring module 108. For example, the cataloging module 110 may cause display of a notification by a computer program executing on an electronic device 114 whenever a determination is made (e.g., by the scoring module 108) that an incoming email from a vendor appears to be malicious. The electronic device 114 may be managed by the employee whose account was the intended recipient of the incoming email, an individual associated with the enterprise (e.g., a member of the information technology department), or an individual associated with a security service.

Some embodiments of the threat detection platform 100 also include a training module 104 that operates to train the models employed by the other modules. For example, the training module 104 may train the models applied by the scoring module 108 to the email data, message data, sign-in data, and mail filter data by feeding training data into those models. Additionally or alternatively, the training module 104 may use publicly available data such as, for example, records of domain age fetched from a database (e.g., that includes WHOIS information). The training data could include emails that have been labeled as malicious or non-malicious, policies related to attributes of emails (e.g., specifying that emails originating from certain domains should not be considered malicious), etc. The training data may be employee-, enterprise-, or vendor-specific so that the models are able to perform personalized analysis. In some embodiments, the training data ingested by the models includes emails that are known to be representative of malicious emails sent as part of an attack campaign. These emails may have been labeled as such during a training process, or these emails may have been labeled as such by other employees.

Overview of External Fraud

A large portion of phishing attacks experienced by enterprises stem from vendor account compromise and vendor impersonation. Enterprises may suffer losses when attackers communicate either via compromised vendor accounts or accounts intended to impersonate vendors. For example, an attacker may use a compromised vendor account to request a change in payment information used by an enterprise to process payments to a vendor or submit a fake invoice. While attackers normally seek to gain money through external fraud, some attackers may seek to gain access to sensitive information related to enterprises or individual employees.

External fraud—especially involving vendors—is a key concern for many enterprises. Conventional defenses are simply not effective in capturing, categorizing, and remediating external fraud, however. Simply put, there are no security products that are designed to detect instances of vendor account compromise or vendor impersonation.

To address this issue, a threat detection platform may attempt to better understand behavior of a vendor with respect to a given enterprise. As further discussed below, the threat detection platform can build a model that attempts to identify instances of compromise through analysis of the context and context of emails that are sent by a vendor account. At a high level, the model may attempt to capture the behavior of the vendor account with respect to a given enterprise account or a given set of enterprise accounts (e.g., those associated with an enterprise).

In contrast to conventional defenses, the threat detection platform may be able to focus on vendor-specific information by investigating (i) the relationship between the sender and recipient of an email (ii) the content of the email, (iii) attachments, and (iv) the domain. For example, the threat detection platform may be able to surface insights by determining whether the email has attachments that are representative of, or contain, invoices, bank account information, financial documents, and the like. As another example, the threat detection platform may be able to surface insights by determining whether the domain is indicative of compromise (e.g., based on whether the domain was recently created). As another example, the threat detection platform may be able to surface insights by determining whether the content of the email contains vocabulary indicative of compromise. For compromise vocabulary, the threat detection platform may analyze the "intent" of the content of an email to determine whether (i) the email is representative of an invoice message and/or (ii) the email is attempting to change a detail of a financial transaction.

Because conventional defenses do not examine vendor-specific information, vendor-related attacks will not only be missed, but vendor behavior over email cannot be understood. As mentioned above, conventional defenses are designed to detect attacks that are similar to past attacks. Because vendor-related attacks vary over time, conventional defenses are unable to detect these attacks.

With phishing attacks, those emails arrive from senders with bad reputations and have malicious payloads (e.g., links or attachments). With vendor account compromise, however, the emails are legitimate—with valid domains, valid sender infrastructure, valid email authentication (e.g., SPF, DKIM, or DMARC), and valid payload. Instead, the focus of the attack is to exploit trust and steal money, merchandise, or information.

Approaches to Detecting External Fraud

External fraud is difficult to detect. Unlike other types of email-based attacks, emails that are sent as part of an external fraud attack tend not to be clearly malicious. There may not be any harmful links that aim to install malware or steal credentials, there may not be any harmful attachments that aim to install malware, and the content is usually seemingly innocuous. External fraud is also quite rare. Enterprises may only be the target of several external fraud attacks per year, though these attacks tend to be hyper targeted.

Taken together, these factors make external fraud difficult to detect in a consistent manner. External fraud can cause massive damage, however, and so it is important to develop a means to discover external fraud so as to prevent harm. In a sense, the threat detection platform can effectively alleviate some responsibility from the fraud departments of enterprises by highlighting potential instances of external fraud.

At a high level, the threat detection platform employs two core strategies:

Discover instances of vendor account compromise where a legitimate vendor account is used to conduct fraud; and Discover instances of vendor impersonation where a registered domain is used to impersonate a vendor domain (e.g., CompanyInc.com versus Company.com, nlcole.com versus nicole.com).

The technologies described below aim to assist in implementing these strategies.

External fraud normally occurs over a series of emails, beginning with an initial engagement and ending with a final attempt to defraud a target. The term "target" may refer to an employee of an enterprise or the enterprise itself. Each series of emails (also referred to as a "thread of emails") is representative of a single instance of external fraud.

As further discussed below, the threat detection platform can employ various technologies to detect instances of external fraud. These technologies include:

A financial intent model (or simply "intent model") that is designed to predict the financial intent of the sender of an email. For example, the intent model may be able to determine, based on context or content, whether an email is representative of a request to pay an invoice or a request to update payment information.

An attachment processing module (also referred to as a "content processing module") that is designed to parse attachments to extract phrases and dollar values in order to determine a "value" for emails.

A vendor database that is representative of a record of counts built off the history of invoice-related conversations that enterprises have had. With the vendor database, the threat detection platform may be able to infer the vendors that work with a given enterprise from the emails transmitted and received by employees of the given enterprise without any additional information. Moreover, the vendor database can be used to answer questions about messages such as: Has the enterprise received an invoice from this domain before? If so, have the past invoices had similar signatures (e.g., in terms of sender identity, Internet Protocol (IP) address, geographical location, etc.)?

One or more external fraud detectors (or simply "detectors") that are designed to detect instances of external fraud using information from the vendor database. At a high level, these detectors may be representative of models, rules, or heuristics that are designed or trained to either identify instances of either vendor account compromise or vendor impersonation. Conceptually, information from the vendor database allows the threat detection platform to establish what normal invoice-related communications for a vendor-enterprise relationship is, and therefore detect abnormalities from this information. As further discussed below, these detectors may also use additional information, such as domain information, attachment information, and IP address information, to ascertain the risk posed by an email.

A reviewing module that is designed to support a computer program through which individuals are able to review and investigate possible cases of external fraud via an interface. Through the interface, an individual may be able to readily examine a history of invoice-related communications for a vendor-enterprise relationship to determine the degree to which an email deviates from normal behavior.

With these technologies, the threat detection platform can emulate a security operations center (SOC) analyst. Normally, SOC analysts spend at least an hour investigating incoming emails that might be representative of attacks. By automatically processing incoming emails, the threat detection platform can partially or entirely supplant the investigation conducted by SOC analysts. For example, the threat detection platform may examine all incoming emails and flag those deemed to representative of external fraud for review and confirmation by SOC analysts.

Figure 2:
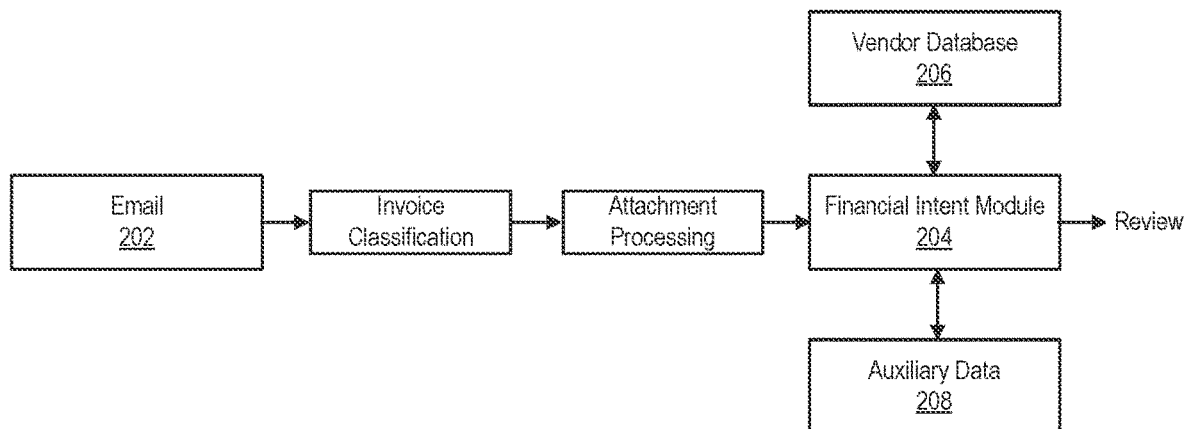
FIG. 2 includes a block diagram that illustrates an example of a detection pipeline that may be employed by a threat detection platform.

FIG. 2 includes a block diagram that illustrates an example of a detection pipeline 200 that may be employed by a threat detection platform. Upon receiving an email 202, an intent module 204 may be responsible for determining the likelihood that the email 202 includes a request for payment. For example, the intent module 204 may analyze content of the body, subject, and any attachments to determine whether the email 202 contains an invoice. Normally, this is accomplished by applying a model to the email 202. Table I includes some examples of features that may be examined by the model. The model may be trained using a set of emails that have been labelled as being representative of invoice messages. This step is important because it helps reduce the problem space that the threat detection platform is analyzing.

TABLE I

Examples of features that may be examined by the model.

| Feature | Description |
|---|---|
| Attachment | The presence of an attachment is a weak signal, but attachments that contain "$" signs and physical addresses are more likely to be invoices. |

TABLE I-continued

Examples of features that may be examined by the model.

| Feature | Description |
| --- | --- |
| Body | A bag-of-words model of the text included in the body is a good signal since terms like "invoice" and "please find attached" are often found in invoice messages. There is usually less value in the semantics or context of sentences since they are usually quite simple. |
| Attachment Name | Analysis of the names of attachments (e.g., through keyword matching) can be a good signal. |
| Subject | Analysis of the subject can be a good signal. |
| Invoice Content | Analysis of terms contained in an invoice - either through optical character recognition or text analysis - can be a good signal. |
| Sender Signature | Analysis of the signature included in the body may indicate the role of the sender, and thus may be helpful in establishing whether the communication is abnormal. |

Thereafter, the threat detection platform can perform a vendor resolution procedure in order to identify the vendor involved in the email 202. Generally, the vendor resolution procedure is a multi-step process. First, the financial intent module 204 will acquire information regarding the email 202. For example, the financial intent module 204 may examine the email 202 and its metadata to identify the sender identity, sender email address, geographical origin, and the like. Second, the financial intent module 204 will identify the vendor based on the acquired information. Some information may correspond directly to a vendor. For example, the identity of the vendor may be established based on the domain of the sender email address. Other information may correspond indirectly to a vendor. For example, the identity of the vendor may be established by applying a natural language processing (NLP) algorithm and/or a computer vision (CV) algorithm to the body of the email 202. Further information regarding entity resolution can be found in Patent Cooperation Treaty (PCT) Application No. PCT/US2019/67279, titled "Threat Detection Platforms for Detecting, Characterizing, and Remediating Email-Based Threats in Real Time," which is incorporated by reference herein in its entirety.

Emails that are determined to be representative of requests to pay invoices by the intent module 204 may be uploaded to the vendor database 206. As mentioned above, the vendor database 206 is representative of a record of counts built off the history of invoice-related conversations. Accordingly, using information stored in the vendor database 206, the threat detection platform may be able to generate counts and signatures for vendors in order to answer questions such as:

Which domains are sending invoices to a given enterprise;
Where do these domains send invoices from; and
Do these domains send invoices from a consistent set of signatures (e.g., in terms of IP address, geographical location, etc.).

Note that the term "signature" may refer to a combination of attributes that collectively define an event, such as the reception or transmission of an email. For example, the "signature" of an incoming email may be defined using the sender name, sender email address, IP address, geographical location, time of transmission, or any combination thereof. The vendor database 206 may be used to establish a baseline of the vendors that an enterprise actually interacts with. Moreover, incoming emails can be compared to the vendor database 206 in order to detect abnormalities in communication behavior that may be indicative of compromise, as further discussed below.

By doing this, the threat detection platform is able to establish the vendors with which an enterprise interacts without requiring any additional information be provided by the enterprise. Instead, these vendor-enterprise relationships can be inferred based on an analysis of emails transmitted and received by employees of the enterprise.

In some embodiments, the intent module 204 uses auxiliary data 208 in order to better understand the intent of the email 202. For example, the intent module 204 may fetch records of domain age from a database (e.g., that includes WHOIS information) and then use those records to determine the age of the domain from which the email 202 originated. This information may provide insights into the intent of the email 202, particularly if the domain is young (e.g., several weeks or months old). Other examples of auxiliary data 208 include IP address information, domain information, NLP algorithms, information regarding behavioral patterns (e.g., frequency of historical behaviors), information regarding employee identities (e.g., job title, function, or department), and the like.

The threat detection platform may be able to filter emails contained in the vendor database 206 by attribute. To gain a better understanding of the threat posed by internal fraud, the vendor database 206 may contain emails received by employees of multiple enterprises in some embodiments, and therefore may be representative of a federated database.

Figure 3:
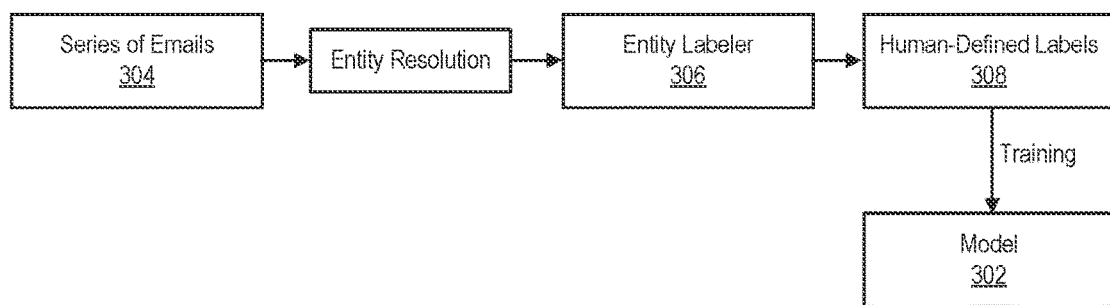
FIG. 3 is a block diagram of a process in which labels are gathered for training a model to be applied by an intent module.

FIG. 3 is a block diagram of a process 300 in which labels are gathered for training a model 302 to be applied by an intent module. Normally, the intent module is implemented by a scoring module (e.g., scoring module 108) of a threat detection platform. To train the model, a series of emails 304 are initially put through entity resolution (also referred to as "entity extraction") and then an entity labeler 306 is tasked with creating appropriate labels for those emails. The entity labeler 306 may be a labeling platform that is internal to the threat detection platform and allows labels to be collected for an "entity," such as an invoice message, uniform resource locator (URL), or image. The entity labeler 306 may be object agnostic so as to allow the threat detection platform to either define its own labels or implement labels defined by, for example, a security service.

To ensure that the model is properly trained, the threat detection platform may gather human-defined labels to establish a ground truth regarding whether an email is malicious or not. To create these labels, the threat detection platform runs heuristic functions (or simply "heuristics") that identify, based on the body, an initial set of emails that could be invoices. The threat detection platform can then load this initial set of emails into the entity labeler 306 for manual labeling. After this initial set of emails has been manually labeled, the threat detection platform can save the human-defined labels 308 as the ground truth dataset. These human-defined labels 308 can also be used to train the model 302 as mentioned above.

Test Suite for Detection Pipeline

In some embodiments, the threat detection platform employs a test suite for the detection pipeline discussed above with reference to FIG. 2. The test suite may contain a set of emails—with malicious and non-malicious messages—with attachments that can be run through the detection pipeline to determine whether vendors and invoices are being properly identified. The set of emails may include actual emails and/or synthetic emails. The term "synthetic email" may be used to refer to an email that was not sent by a sender to a recipient but instead was created for testing purposes.

Generally, the test suite is run through the detection pipeline on a periodic basis. For example, the test suite may be run through the detection pipeline on a daily, weekly, or monthly basis. Additionally or alternatively, the test suite may be run through the detection pipeline on an ad hoc basis. For example, if the threat detection platform determines that accuracy of the model employed by the intent module falls below a threshold (e.g., based on the number of false positives or false negatives), then the test suite may be run through the detection pipeline as a means of diagnosing the issue. Similarly, the test suite may be altered on a periodic or ad hoc basis. For example, emails may be added to, or removed from, the test suite whenever it is run through the detection pipeline.

The test suite could also be used for training purposes in some embodiments. Accordingly, the test suite may be useful in increasing the scope of what qualifies as an "invoice" according to the model applied by the intent module. Historically, invoices have commonly been delivered in the form of attachments in Portable Document Format (PDF) format. Not all invoices are sent as PDFs, however, and it is becoming increasingly common to share invoices through links, shared documents, images, and other formats. By updating the test suite, the threat detection platform is able to account for these changes. Accordingly, the threat detection platform can assess all incoming emails regardless of the form that the invoices may take.

Detection and Prevention of External Fraud

FIG. 4 includes a flow diagram of a process 400 for detecting instances of external fraud through analysis of emails addressed to employees of an enterprise. Note that while an email may be described as transmitted "from a vendor," the email is actually transmitted with an email account that is associated with the vendor. Similarly, while an email may be described as transmitted "to an enterprise," the email is actually transmitted to an email account that is associated with the enterprise.

Initially, a threat detection platform can obtain an email that is addressed to an email account associated with an enterprise (step 401). As discussed above with reference to FIG. 1, the threat detection platform can obtain the email in several different ways. For example, the threat detection platform may be integrated into the email system of the enterprise via an API. In such embodiments, the threat detection platform may obtain the email via the API. Then, the threat detection platform can establish that the email is representative of an instance of outreach by a vendor for payment of an invoice by the enterprise (step 402). For example, the threat detection platform may determine, based on an analysis of the email, that the email was sent from an email address with a domain (e.g., @vendor.com) that is associated with the vendor. Moreover, the threat detection platform may determine, based on an analysis of the email, that an invoice is contained therein. This may require that the threat detection platform examine the subject and body of the email, as well as any attachments.

Thereafter, the threat detection platform can access a database to identify a profile that is associated with the second email account (step 403). In some embodiments, the profile is associated solely with the second email account, and thus is representative of a historical record of emails received by employees from the second email account. In other embodiments, the profile is associated with the vendor. In such embodiments, the profile may be representative of a historical record of emails received by employees from multiple email accounts that are associated with the vendor.

The database may be a federated database that includes a series of profiles that are associated with different vendors. Each profile may include (i) a classification indicative of the risk in communicating with the corresponding vendor and (ii) information regarding how the classification was determined. This information may include (i) a record of vendor email accounts with which contact has been initiated on behalf of the vendor, (ii) a record of enterprise email accounts with which contact was initiated, or (iii) information regarding the types of attacks, if any, in which the vendor was found to be involved. As noted above, the threat detection platform may classify vendors as being "low," "medium," or "high" risk, or the threat detection platform may quantify the risk of vendors using a predefined scale (e.g., 1-5, 1-10, or 1-100). The classification itself is not important, so long as the threat detection platform can determine whether the risk is sufficiently high (e.g., in comparison to a programmed threshold) so as to merit further action to remediate the risk.

The threat detection platform can then obtain a metric that is indicative of the risk in communicating with the second email account (step 404). For example, the threat detection platform may acquire the metric directly from the digital profile associated with the vendor. As another example, the threat detection platform may produce the metric based on the degree of similarity between the email and past emails for which information is available in the digital profile. Accordingly, the metric may be indicative of the degree to which email confirms with the historical instances of outreach, either by the second email account or the vendor as a whole.

Then, the threat detection platform can determine, based on the metric, how to handle the email (step 405). For example, if the metric indicates that the risk in communicating with the vendor is high, then the threat detection platform may implement a filter so as to at least temporarily prohibit emails from the vendor from being received by employees of the enterprise. As another example, if the metric indicates that the risk in communicating with the vendor is high, then the threat detection platform may cause display of a notification by a computer program that includes information regarding the instance of outreach by the second email account. One example of such a notification is shown in FIG. 12. The information may include the email address associated with the first email account, the email address associated with the second email account, a time at which the email was transmitted, a geographical location from which the email was transmitted, an IP address from which the email was transmitted, or any combination thereof. As another example, if the profile indicates that the risk in communicating with the vendor is low, then the threat detection platform may allow the email to reach its intended destination, namely, the inbox of the first email account.

In some embodiments, external fraud detection is employed as part of a multistage approach to determining how to handle the email. For example, the threat detection platform may apply a first model to the email to produce a first output indicative of whether the email is representative of a non-malicious email. If the threat detection platform determines, based on the first output, that the email is representative of a malicious email, then the threat detection platform may apply a second model to the email to produce a second output indicative of whether the email is representative of a given type of malicious email. The determination regarding how to handle the email may be based on the first output and/or the second output in addition to the profile for the vendor. Further information on multistage analysis of emails can be found in U.S. application Ser. No. 16/927,427, titled "Multistage Analysis of Emails to Identify Security Threats," which is incorporated by reference herein in its entirety.

FIG. 5 includes a flow diagram of a process 500 for determining whether an incoming email is indicative of external fraud based on its context and content. Initially, a threat detection platform can obtain an email that is addressed to a first email account associated with an enterprise (step 501). Step 501 of FIG. 5 may be similar to step 401 of FIG. 4. The threat detection platform can then establish that the email was sent with a second email account associated with a vendor by examining content of the email (step 502). For example, the threat detection platform may apply a model to the email that examines (i) the subject, (ii) the body, and (iii) any attachments to identify the source of email. As another example, the threat detection platform may simply examine the email address from which the email was sent to determine whether its domain is associated with a vendor.

Thereafter, the threat detection platform can access a database to identify a digital profile that includes a record of past emails sent with the second email account (step 503). In some embodiments, the database is a federated database that includes information gleaned through analysis of emails addressed to employees of multiple employers. Accordingly, only a portion of the past emails may have been addressed to the enterprise. In other embodiments, the database is a private database that only includes information gleaned through analysis of emails addressed to employees of the enterprise.

The threat detection platform can then determine, based on the digital profile, whether the email differs from the past emails in terms of context and/or content to such a degree that compromise of the second email account is likely (step 504). At a high level, the threat detection platform may seek to understand the risk posed by communicating with the second email account by not only determining whether the context is normal, but also whether the content is normal. Thus, the threat detection platform may examine whether the first email account was the recipient of any of the past emails included in the digital profile. This allows the threat detection platform to establish whether communication between the first and second email accounts is unusual. Additionally or alternatively, the threat detection platform may examine whether the topic of the email was discussed in any of the past emails. This allows the threat detection platform to establish whether the topic of the email is unusual.

The strongest signal that the email is representative of normal behavior is if (i) the second email account previously communicated with the first email account and (ii) the topic of the email is one previously discussed by the first and second email accounts. Meanwhile, the strongest signal that the email is representative of abnormal behavior is if (i) the second email account has not previously communicated with the first email account and (ii) the topic of the email is one that has not been previously discussed by the second email account.

The threat detection platform can then determine how to handle the email based on the likelihood of compromise (step 505). For example, if the threat detection platform determines that the email conforms with the past emails—indicating compromise is unlikely—then the email may be permitted to reach its intended destination (i.e., the inbox of the first email account). However, if the threat detection platform determines that the email deviates from the past emails—indicating compromise is likely—then the email may be at least temporarily prevented from reaching its intended destination. Additional action may be taken to determine whether the second email account is actually compromised. For example, the threat detection platform may search for other emails sent with the second email account to establish whether abnormal behavior is being exhibited with respect to any other enterprise accounts.

FIGS. 6-11 illustrate how information regarding internal and external fraud may be documented and then presented for review by an individual. This information may be presented on interfaces that are generated by a threat detection platform (e.g., threat detection platform 100 of FIG. 1). These interfaces may be accessible through a computer program that is executing on a computing device associated with the individual. Examples of computer programs include web browsers, desktop applications, mobile applications, and over-the-top (OTT) applications.

FIG. 6 includes an example of an interface with a threat log for an invoice. Looking more closely at the threat log, it can be seen that the threat detection platform determined that an enterprise account sent a suspicious invoice. The invoice was deemed suspicious because it (i) mentioned a never-before-seen vendor and (ii) provided never-before-seen payment information (e.g., bank name and routing number). This type of email is quite suspicious, and the threat detection platform has flagged it as such.

Moreover, the threat detection platform has determined that there are several indicators that the enterprise account may be compromised. As shown in FIG. 6, the threat detection platform not only discovered that the enterprise account created an unusual mail filter that is indicative of compromise, but also logged on from a geographical location for which travel would have been impossible given the location of the prior login.

The information shown in the section labeled "Analysis Overview" may be extracted, derived, or otherwise gleaned from digital activities performed with the enterprise account by the threat detection platform. For example, the threat detection platform may apply models to an outgoing email and its accompanying metadata in order to gain insights into behavior, content, or identity.

FIG. 7 includes an example of an interface with an invoice analysis. This interface may be shown responsive to receiving input indicative of a selection of "Invoice Analysis" on the overview panel shown in FIG. 6. The invoice analysis may include details regarding the actual invoice of interest. These details may include vendor name, email address, date, amount, mailing address, or payment information (e.g., bank name and routing number).

As can be seen in FIG. 7, the threat detection platform may visually indicate why the invoice was found to be risky. For example, the threat detection platform may locate a graphical element referred to as a "pill" proximate to the details that were deemed unusual or abnormal. Here, for example, pills have been used to indicate that the vendor and payment information have never been seen before.

FIG. 8 includes an example of an interface on which information regarding a potential instance of vendor account compromise (also referred to as "vendor takeover") is presented. This interface includes the insights derived by the threat detection platform that resulted in a determination that the vendor account may be compromised. Here, for example, the threat detection platform determined that an account associated with Prolia Systems may be compromised based on three features of an incoming email received form the account. The threat detection platform may have determined that each of these features was unusual based on a comparison to past emails received from the account or other accounts associated with Prolia Systems. For example, the threat detection platform may determine that the geographical location from which the email originated is different than the geographical location from which emails sent by the account normally originate. As another example, the threat detection platform may determine that the content or context of the email is different than emails normally sent by Prolia Systems. For instance, if invoices sent by Prolia Systems are normally attached to incoming emails as PDFs but the email at issue includes a link, the threat detection platform may identify this as an unusual and unexpected change.

As can be seen in FIG. 8, information regarding the vendor and targets may also be shown on the interface. For the vendor, this information may include geographical location, known accounts, primary point of contact, and history of interactions (e.g., number of invoices, average number of communications on a weekly or monthly basis, etc.). For the targets, this information may include geographical location, known accounts, and role. Together, the information may allow an individual to more easily understand the basis for why an incoming email was deemed risky by the threat detection platform. Moreover, the information may allow the individual to more easily remediate or prevent threats, for example, by identifying those targets who frequently receive risky emails.

The interface may also include a case timeline (also referred to as a "threat timeline") that indicates when important events involving the potential instance of vendor account compromise occurred. Here, for example, the case timeline includes two entries, a first entry indicating when Lucia Foreman of Prolia Systems sent an email to Renee West and a second entry indicating when Renee West responded to the email. The case timeline may be helpful in tracking direct communication with the compromised account, as well as indirect communication involving the compromised account. For example, because the threat detection platform is able to monitor all emails exchanged by accounts associated with the enterprise, the threat detection platform may know whether Renee West forwarded the email to another employee at the enterprise. At a high level, the case timeline may serve as a form of aggregated analysis that illustrates the total impact of the email sent by the compromised account.

Figure 9:
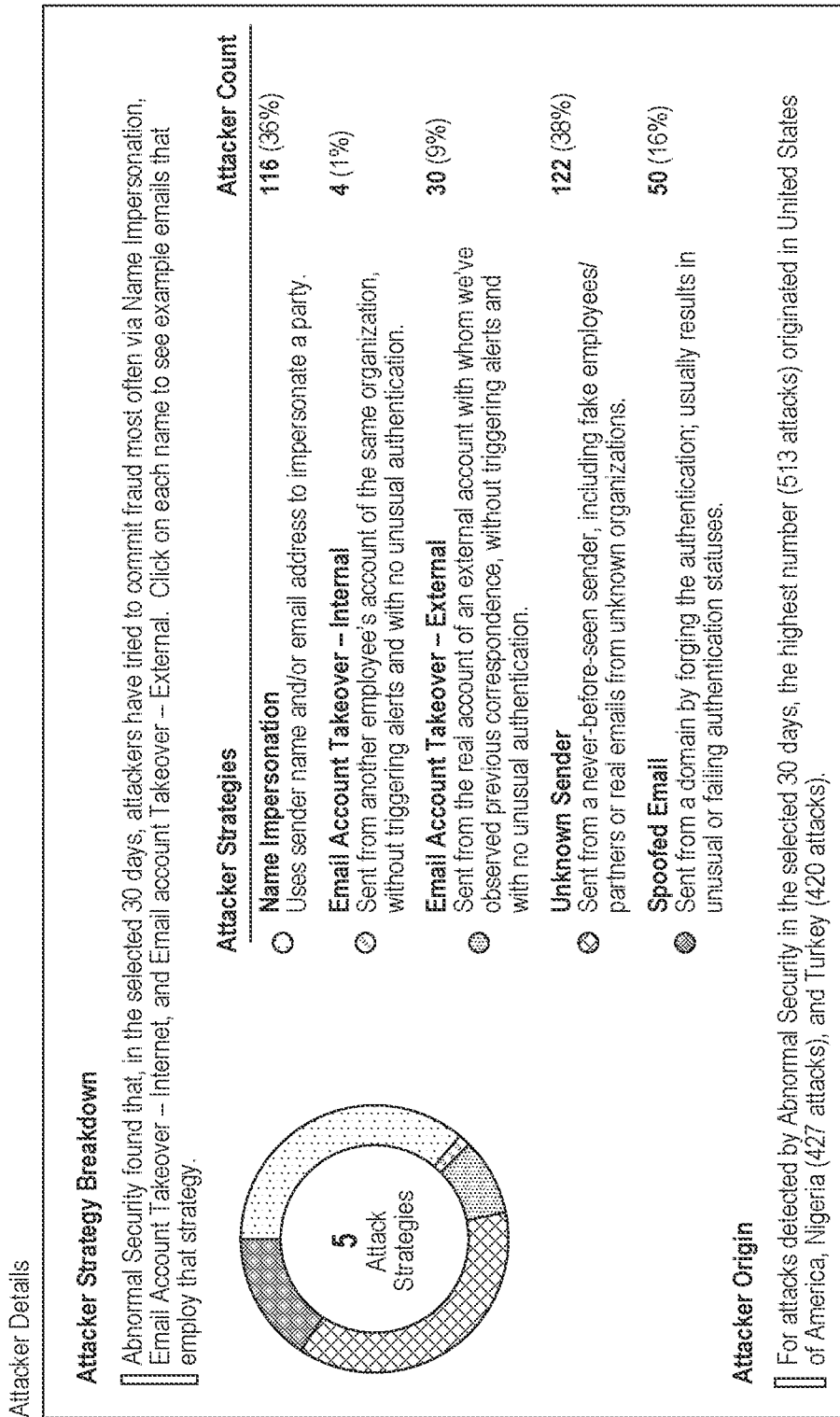
FIG. 9 includes an example of an interface that shows how attacks can be categorized by the threat detection platform.

FIG. 9 includes an example of an interface that shows how attacks can be categorized by the threat detection platform. This type of visualization component (or simply "visualization") may be created for a single vendor, multiple vendors, a single enterprise, or multiple enterprises. Here, for example, the visualization specifies the types of attack strategies that have been observed by the threat detection platform for multiple enterprises over an interval of time. In some embodiments, the interval of time is manipulable. For example, an individual may be able to indicate whether she is interested in observing the attack strategies observed during the last 30 or 60 days. Because of the ever-changing nature of threats, however, relatively short intervals of time (e.g., less than 90 days) are normally more useful in understanding the types of attacks that an enterprise may experience.

In addition to a summary of each attack strategy, the visualization may also surface information regarding compromised or impersonated vendors. Examples of such information include email addresses, domains, and the like. Moreover, the visualization may provide the actual number of attacks observed over the interval of time. These numbers may be helpful in understanding the prevalence of certain attacks.

Figure 10:
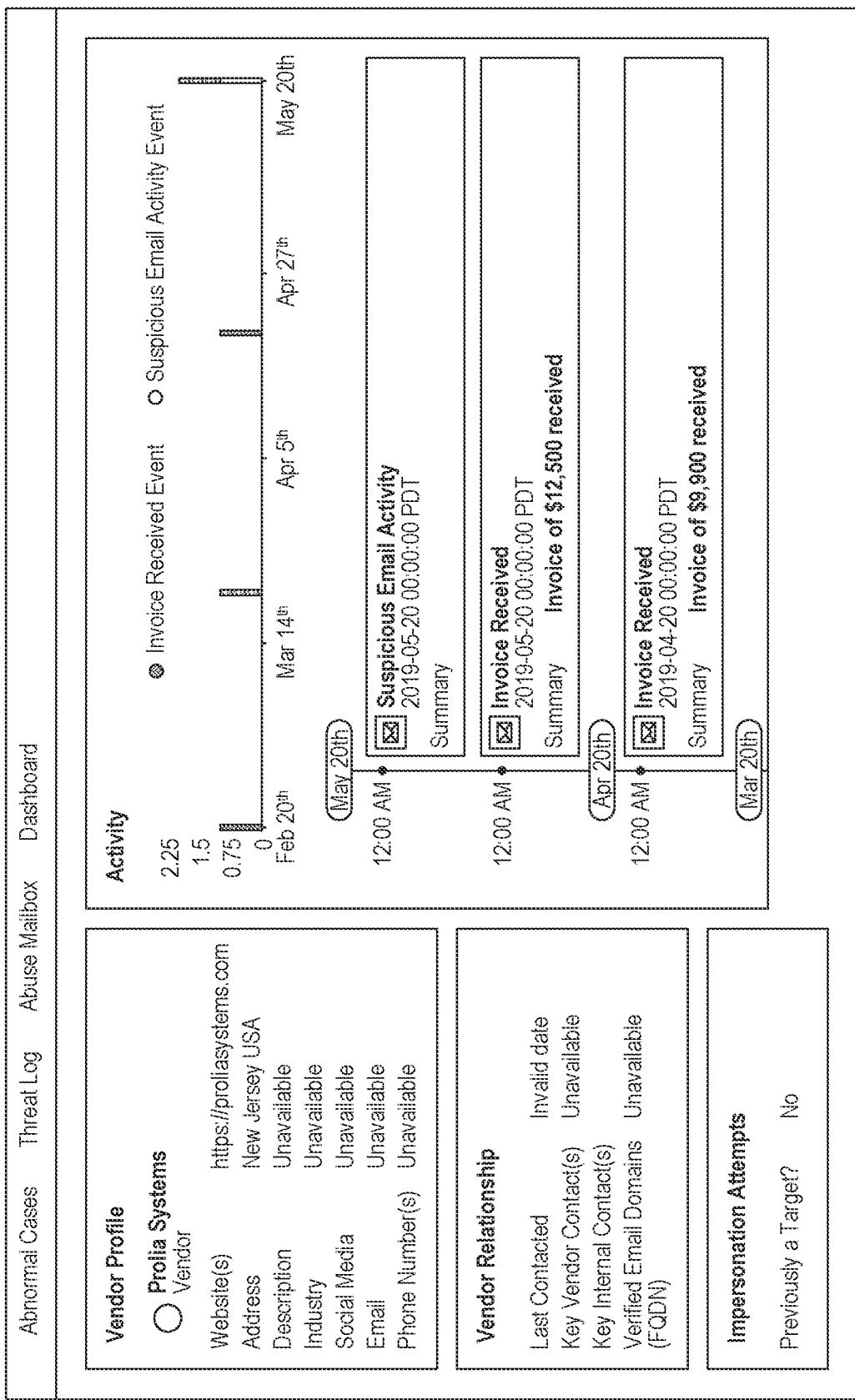
FIG. 10 includes an interface with a visual representation of a profile for a vendor in a vendor database.

FIGS. 10-11 include interfaces with different visual representations of a profile for a vendor in a vendor database. In this case, the vendor is Prolia Systems. As shown in FIGS. 10-11, the visual representation can include various information related to the vendor. Along the left side of the interface, a vendor profile includes basic information regarding the vendor, such as its name, website, geographical location, and business category.

Beneath the vendor profile are insights that have been uniquely found, detected, or inferred by the threat detection platform through, for example, analysis of emails addressed to employees of multiple enterprises. Some of these insights are enterprise specific. One example of an enterprise-specific insight is contacts who have communicated with Prolia Systems in the past, and thus are part of the vendor-enterprise relationship. Other examples of enterprise-specific insights include the last time of contact, frequency of contact, type of contact (e.g., whether payments are made by the enterprise to the vendor), and the like. Other insights are enterprise generic. One example of an enterprise-generic insight is whether the vendor has been the subject of any impersonation attempts. In some embodiments, data obtained elsewhere is also incorporated into the insights. For example, the vendor insights may include information regarding the BitSight score, whether there is any history of data breach, etc.

Vendor insights may be based on data that is collected by the threat detection platform or acquired by the threat detection platform from another source. For example, the threat detection platform may acquire data from a service (e.g., BitSight) via a data partnership or another product employed by the enterprise, such as an enterprise resource planning (ERP) system or customer relationship management (CRM) system. Regardless of its source, the data will be related to any of (i) the vendor, (ii) the sender of the email that has been traced to the vendor, or (iii) the history of the relationship between the vendor and enterprise in question.

Along the right side of the interface shown in FIG. 10, a timeline of activities performed with accounts associated with Prolia Systems is shown. The timeline may be helpful in understanding how risk was determined by the threat detection platform. Here, for example, invoices have historically been received from Prolia Systems on a consistent (e.g., monthly) basis. Because an invoice was received that does not conform to that pattern, the threat detection platform flagged the invoice as suspicious. The timeline may also be used to visually illustrate whether communication with Prolia Systems is increasing or decreasing in frequency.

Beneath the timeline, there is a temporal record of the activities involving Prolia System. This temporal record may include more information regarding the activities shown in the timeline. As shown in FIG. 10, this temporal record may include activities that have been deemed suspicious and activities that have been deemed non-suspicious. Suspicious events may be shown in a different color than non-suspicious events, or suspicious events may be accompanied by a different logo or graphic than non-suspicious events. Note that individuals may only be permitted to see limited information related to federated content. Assume, for example, that two enterprises (Company A, Company B) deal with a vendor (Vendor C), and that an account associated with Vendor C has attempted to defraud an employee at Company A. In such a situation, the profile corresponding to Vendor C that is visible to Company B may show an anonymized version of the event. Accordingly, Company B may be aware of the event but not who Vendor C attempted to defraud.

The duration of the temporal record may be defined by the threat detection platform or an individual. By default, activities that have occurred during the last 15, 30, or 60 days may be shown. Embodiments may utilize different intervals of time depending on whether temporality is found to improve the precision of scoring. For example, the threat detection platform may discover that analysis of activities occurring during the last 30 days may be appropriate for scoring in some cases, while the threat detection platform may discover that analysis of activities occurring during the last 60 days may be appropriate for scoring in other cases. As another example, the threat detection platform may consider "low-risk events" that have occurred during the last 30 days and "high-risk events" that have occurred during the last 60 days. Those skilled in the art will recognize that these intervals of time have been provided purely for the purpose of illustration.

In FIG. 11, meanwhile, the risk level determined for Prolia Systems is shown. The risk level is currently "high" based on analysis of recent activities involving Prolia Systems. There are various ways in which the risk level can be conveyed. For example, the threat detection platform may classify vendors as being "low," "medium," or "high" risk, or the threat detection platform may quantify the risk of vendors using a predefined scale (e.g., 1-5, 1-10, or 1-100).

There are several reasons why the threat detection platform has determined that Prolia Systems has been compromised or impersonated. First, multiple sources have reported that Prolia Systems is acting as though it is compromised. This may occur if employees at different enterprises have flagged the activity of Prolia Systems as unusual. Second, there have been 5 impersonation attacks by Prolia Systems and nearly 2,900 impersonation attacks by Prolia Systems that were observed across the entities whose activities are monitored by the threat detection platform. And third, the last incident involving Prolia Systems occurred very recently (e.g., within the last two hours).

While not shown in FIG. 11, the threat detection platform may also know whether Prolia Systems has been blacklisted by any entities whose activities are monitored using a federated database. Presence on a blacklist may serve as another reason for determining that Prolia Systems is compromised. Further information on federated databases can be found in PCT Application No. PCT/US2021/19977, titled "Federated Database for Establishing and Tracking Risk of Interactions with Third Parties," which is incorporated by reference herein in its entirety.

Embodiments may utilize different thresholds when it comes to classifying the risk posed by interacting with a vendor. Assume, for example, that the threat detection platform is configured to output a metric between 1 and 100 that is indicative of risk, where higher numbers correspond to higher risk. Vendors with scores above a threshold (e.g., 80) may be deemed risky in some situations and not risky in other situations. Rather than rely solely on the metric itself, the threat detection platform can consider chronology by taking into account the history of the relationship between a vendor and enterprise. Activities performed by one vendor may be considered unusual, while the same activities performed by another vendor may be considered normal.

As discussed above, the threat detection platform may be responsible for addressing the risk posed by interacting with Prolia Systems on behalf of the enterprise in question. Additionally or alternatively, the enterprise may take some internal action to mitigate the risk. Examples of such actions include creating a filter so as to block incoming emails from Prolia Systems, notifying employees or departments of the risk, and initiating contact with a trusted individual employed by Prolia Systems.

FIG. 12 includes an example of a notification that may be presented to an individual for review responsive to a determination that a vendor has been compromised or impersonated. For example, the notification may be generated by a cataloging module (e.g., cataloging module 110) and then transmitted to an electronic device (e.g., electronic device 114) for display to the individual. The individual may be the employee whose account was the intended recipient of an email from the vendor, an individual associated with the enterprise (e.g., a member of the information technology department), or an individual associated with a security service.

As can be seen in FIG. 12, the notification may provide some information regarding the threat posed by further interaction with the vendor, though more information may be readily accessible (e.g., via links in the notification). The information included in the notification may simply attempt to convey the urgency of the threat to the recipient. For example, the recipient may be able to infer the risk based on whether the affected employee is a member of the finance department, whether the affected vendor is a core vendor with which the enterprise does significant business, etc.

FIG. 13 includes an example of an interface with a list view of the profiles in a federated database. The list view may include information regarding some or all of the vendors included in the federated database. As shown in FIG. 13, the list view may specify the name, risk level, and other information for each vendor. For example, the list view may include (or link to) a list of vendor accounts from which contact was initiated and/or a list of enterprise accounts with which contact was initiated. The vendor accounts may correspond to different vendor contacts, while the enterprise accounts may correspond to different enterprise contacts. The list view may also include a column that shows whether the information regarding each vendor is "fresh." Whether the determination of a risk level was made based on information from several days, weeks, or months ago may impact how much individuals rely on that risk level. Moreover, the list view may include a threat summary that indicates, at a high level, why vendors were classified as risky. As an example, Prolia Systems has been classified as high risk because its recent activities were indicative of compromise and spoofing.

Attribute Extraction and Scoring

Figure 14:
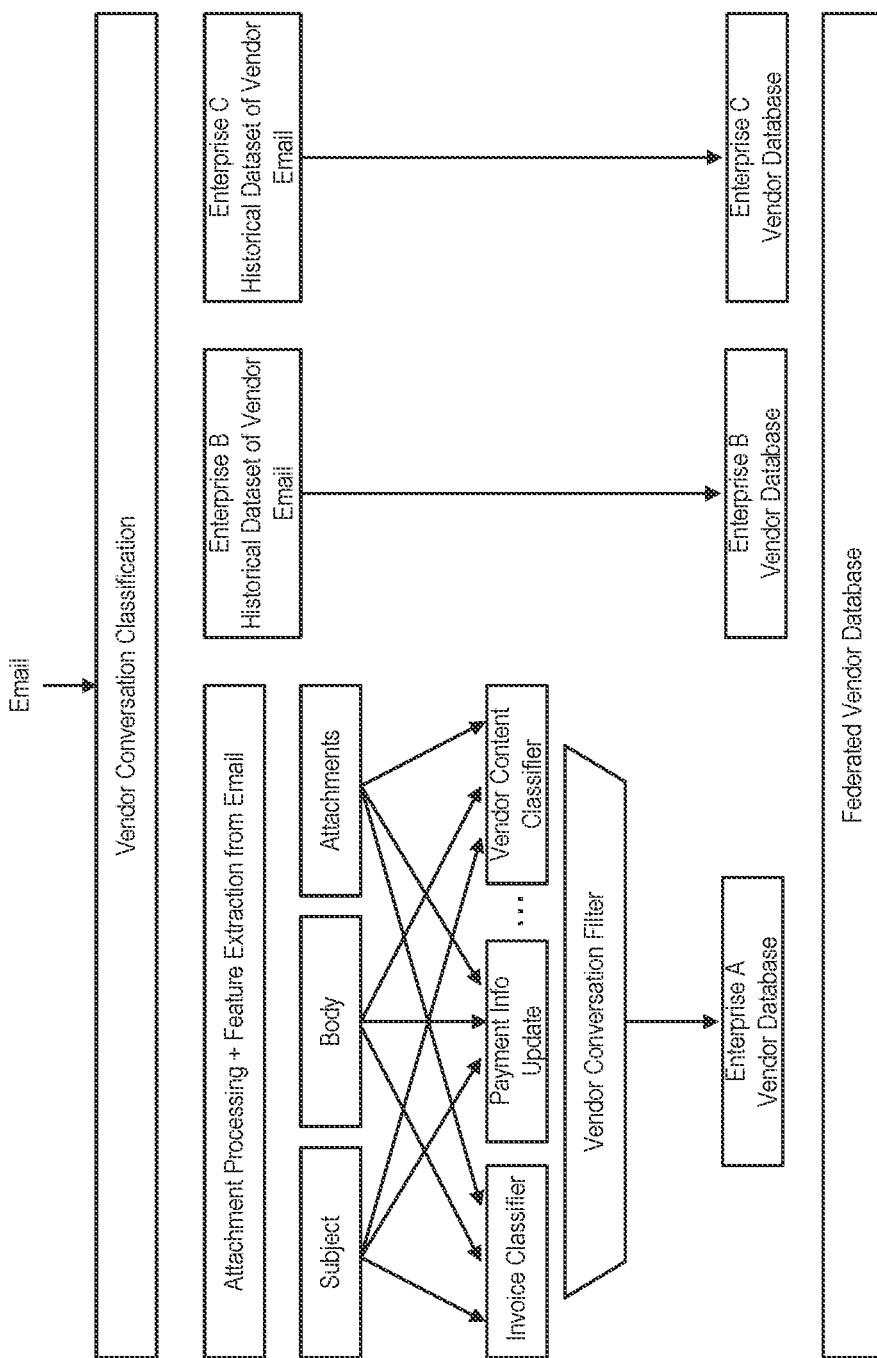
FIG. 14 includes a block diagram illustrating how a vendor database can be built as incoming emails addressed to employees of an enterprise are examined.

FIG. 14 includes a block diagram illustrating how a vendor database can be built as incoming emails addressed to employees of an enterprise are examined. As discussed above, a threat detection platform may be permitted to examine incoming emails in order to determine whether those emails should be permitted to reach their intended destinations (i.e., the inboxes of employees). As part of this process, the threat detection platform may attempt to establish whether the incoming emails are sent with accounts associated with vendors. For each email sent with a vendor account, the threat detection platform can create a new entry in the vendor database. Thus, the threat detection platform can "rebuild" the vendor database as new emails arrive from vendor accounts.

As mentioned above, the threat detection platform may be responsible for monitoring the incoming emails addressed to employees of multiple enterprises. As such, the vendor database may be representative of a federated database that acts as a central repository where information can be shared so as to enable preventative action before attempts at external fraud are successful.

At a high level, FIG. 14 illustrates how normal behavior of vendors can be populated into the vendor database. As the threat detection platform processes incoming emails, the threat detection platform can identify non-malicious exchanges with vendors and then populate information regarding each exchange into the vendor database. Said another way, the threat detection platform can record information regarding safe conversations with vendors in the vendor database. This information may include information regarding the individuals associated with each vendor who are normally involved in finance-related conversations (e.g., those involving invoices), typical email addresses from which emails are received, typical invoice patterns, and the like. More granular information may be extracted, inferred, or derived for some of these. For example, when determining the typical invoice pattern for a given vendor, the threat detection platform may establish the computer program used to create PDFs attached to incoming emails from the given vendor, the format of those PDFs, metadata characteristics of those PDFs, etc. All of this information can be used as signals in the detection pipeline to identify instances of external fraud.

Figure 15:
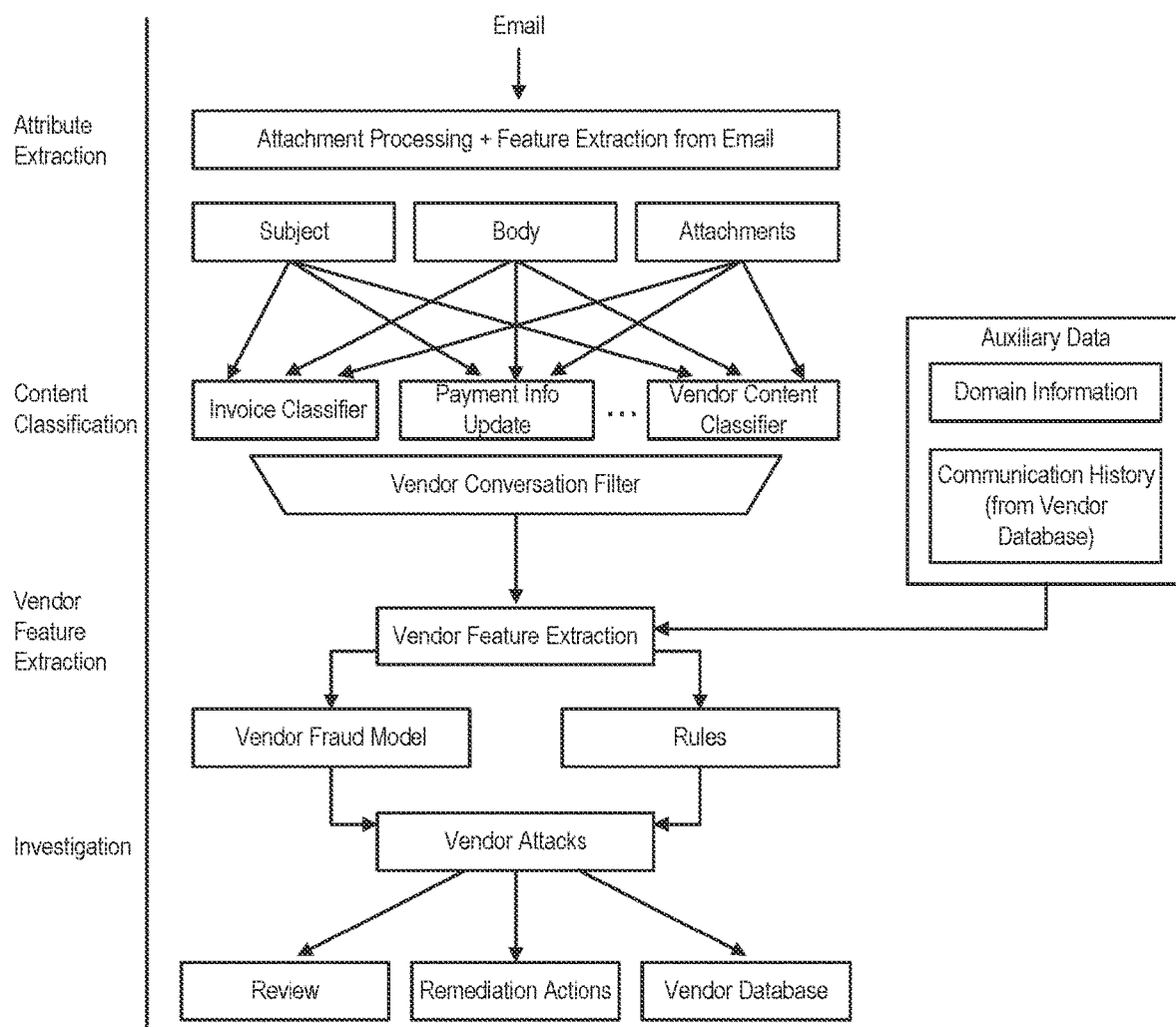
FIG. 15 includes a block diagram illustrating how the detection pipeline discussed above with reference to FIG. 2 may be implemented in conjunction with a vendor database.

FIG. 15, meanwhile, includes a block diagram illustrating how the detection pipeline discussed above with reference to FIG. 2 may be implemented in conjunction with a vendor database. As shown in FIG. 15, there are four core stages, namely, attribute extraction, content classification, vendor feature extraction, and investigation.

Figure 16A:
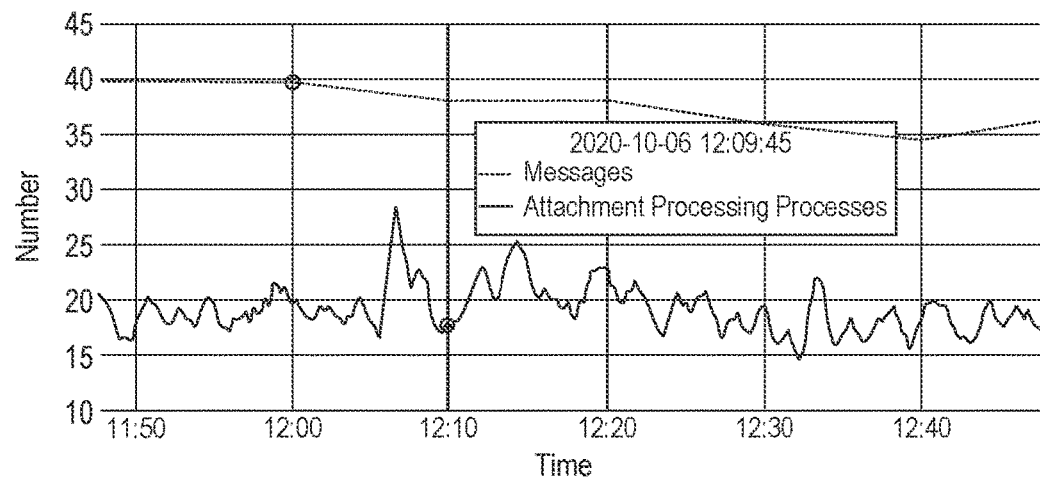
FIGS. 16A-B include examples of communication graphs that may be used to summarize vendor-enterprise relationships.
Figure 16B:
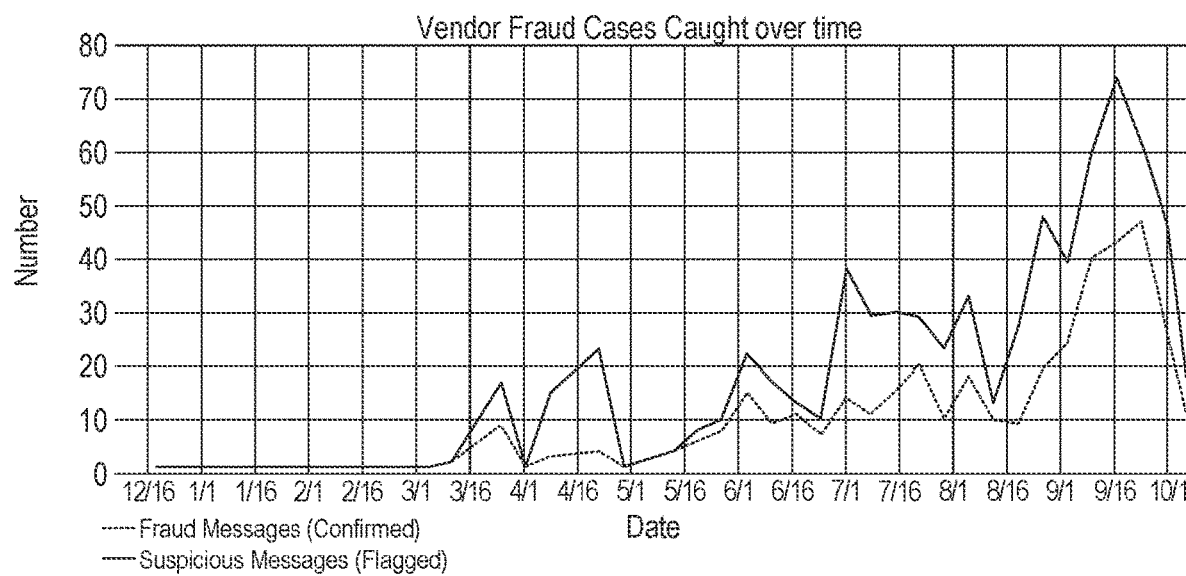

As mentioned above, the federated vendor database includes information regarding communications between enterprises and vendors. Moreover, the depth and breadth of this information may vary over time since the federated vendor database is built from emails that have been classified by the threat detection platform as being finance-related vendor messages. Various features may be represented in the federated vendor database. As an example, on a per-vendor basis, the threat detection platform may record (i) the geographical locations from which emails sent with vendor accounts originate, (ii) the IP addresses from which emails sent with vendor accounts originate, (iii) information regarding the vendor-enterprise relationship, and (iv) information gleaned from metadata accompanying emails sent with vendor accounts. Information regarding the vendor-enterprise relationship may be helpful in establishing, for example, how often a given vendor account communicates with an enterprise, how often the given vendor account communicates with a given enterprise account, and where the given vendor account normally emails from (e.g., in terms of geographical location or IP address). In some embodiments, the federated vendor database summarizes the vendor-enterprise relationship in the form of a communication graph, examples of which are shown in FIGS. 16A-B. From the metadata, the threat detection platform may be able to establish patterns such as whether a given vendor account normally uses a particular web browser (e.g., Google Chrome) to send emails.

In sum, FIG. 15 illustrates how instances of external fraud can be detected and then recorded by the threat detection platform in the vendor database. After determining that an email is indeed representative of some kind of vendor conversation, the threat detection platform can extract features that are relevant to the conversation from auxiliary data, including the vendor database that is developed as discussed with reference to FIG. 14. After features have been extracted for the email, the threat detection platform may run the email through detection models, algorithms, or rules to identify any indicators that the email is representative of an attack. In the event that the threat detection platform determines the email is representative of an attack, the email can be queued for remediation and review as discussed with reference to FIG. 17. Moreover, the email or information related to the email may be fed back into the vendor database in order to record the attack.

Figure 17:
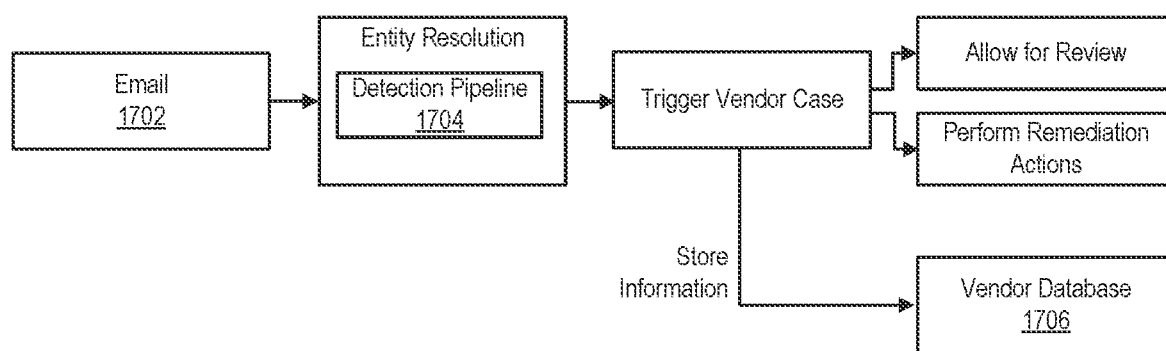
FIG. 17 includes a high-level illustration of a process by which a threat detection platform generates vendor cases.

FIG. 17 includes a high-level illustration of a process 1700 by which a threat detection platform generates vendor cases. At a high level, FIG. 17 illustrates the flow of emails that are considered possible instances of vendor compromise. When an email is received, the threat detection platform may run the email through a detection pipeline. Based on the outputs produced for the email, several different outcomes are possible. For example, analysis of the email by the threat detection platform may trigger review (e.g., by a SOC analyst), remediation (e.g., automatic deletion of the email), or recordation (e.g., by storing relevant information in a vendor database, thereby contributing to risk scores and future determinations of risk in interacting with vendors).

Initially, the threat detection platform may obtain an email 1702 as discussed above. Then, the threat detection platform can perform an entity resolution procedure to determine whether the email 1702 was sent by a vendor account. In some embodiments, the entity resolution procedure is completed by the threat detection platform so as to automatically detect the involvement of vendors (e.g., based on an analysis of the content of the email 1702). In other embodiments, the entity resolution procedure is completed by an individual who manually indicates (e.g., through an interface generated by the threat detection platform) whether any vendors are involved. As part of the entity resolution procedure, the threat detection platform may also pass the email 1702 through a detection pipeline 1704 in order to establish whether the email 1702 includes an invoice. The detection pipeline 1704 is further discussed above with reference to FIG. 2.

If the threat detection platform determines that (i) the email 1702 was sent by a vendor account and (ii) the email 1702 includes an invoice or other request for payment, then the threat detection platform can create a vendor case. The term "vendor case" may refer to a digital event—such as the reception of an email—that involves a vendor and requires further analysis to ascertain the threat posed. In some embodiments, the threat detection platform handles vendor cases on its own. For example, the threat detection platform may perform remediation actions (e.g., preventing delivery of emails from the vendor account) responsive to a determination that the content or context of the email 1702 indicates that the vendor account may be compromised. Additionally or alternatively, the threat detection platform may allow an individual to review the vendor case and specify appropriate remediation actions. Regardless of whether any remediation actions are taken, the threat detection platform may upload information related to the vendor case to the vendor database 1706 so as to record receipt of the email 1702.

As vendor cases are generated, the threat detection platform may produce scores that are indicative of the threat posed by interacting with the corresponding vendors. The scores may be based on factors related to the employee to whom the email 1702 is addressed, the enterprise that employs the employee, the vendor, or the email 1702. As an example, the score produced for the email 1702 that is sent from a vendor may be based on the number of times that the vendor has been compromised or impersonated. If that number exceeds a threshold during a predetermined interval of time (e.g., 7 days, 30 days, or 60 days), then the risk may be considered high. Conversely, if the number falls below the threshold, then the risk may be considered low. Other signals may also be taken into account when producing these scores. For example, the threat detection platform may consider the type of attack of which the email 1702 is representative and the estimated value of the attack.

Those skilled in the art will recognize that the scores could have various forms. For example, the threat detection platform may classify the risk posed by emails from vendors as being "low," "medium," or "high," or "red," "yellow," or "green," or the threat detection platform may quantify the risk posed by emails from vendors using a predefined scale (e.g., 1-5, 1-10, or 1-100). Examples of scoring rubrics are provided in Tables II and III.

TABLE II

A first example of a scoring rubric.

| Rating | Description |
| --- | --- |
| Red | Vendor has at least 1 compromise or impersonation event in the last 30 days. |
| Yellow | Vendor has at least 1 compromise or impersonation event in the last 60 days. |
| Green | Vendor has not had any compromise or impersonation events in the last 60 days. |

TABLE III

A second example of a scoring rubric.

| Rating | Description |
| --- | --- |
| 9 | Vendor has at least 1 compromise or impersonation event in the last 30 days. |
| 7 | Vendor has at least 1 compromise or impersonation event in the last 45 days. |
| 5 | Vendor has at least 1 compromise or impersonation event in the last 60 days. |
| 3 | Vendor has at least 1 compromise or impersonation event in the last 75 days. |
| 1 | Vendor has at least 1 compromise or impersonation event in the last 90 days. |
| 0 | Vendor has not had any compromise or impersonation events in the last 90 days. |

Processing System

Figure 18:
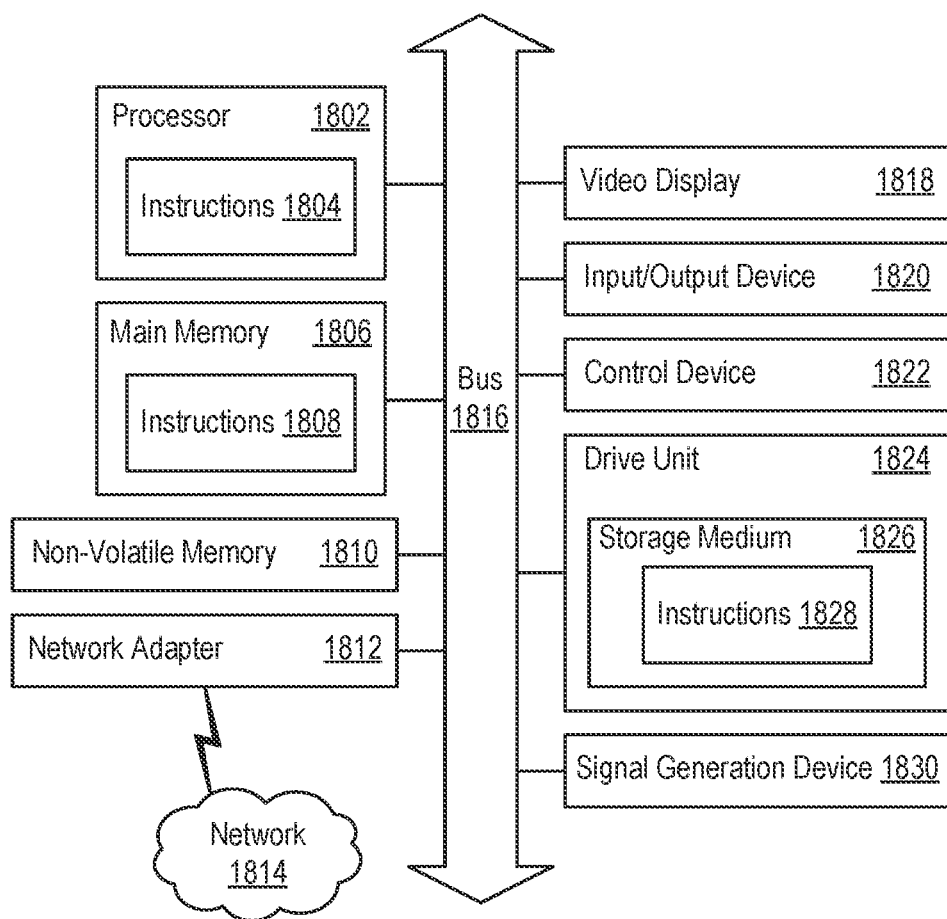
FIG. 18 is a block diagram illustrating an example of a processing system in which at least some operations described herein can be implemented.

FIG. 18 is a block diagram illustrating an example of a processing system 1800 in which at least some operations described herein can be implemented. For example, components of the processing system 1800 may be hosted on a computing device that includes a threat detection platform. As another example, components of the processing system 1800 may be hosted on a computing device that is queried by a threat detection platform to acquire emails, data, etc.

The processing system 1800 may include a central processing unit (also referred to as a "processor") 1802, main memory 1806, non-volatile memory 1810, network adapter 1812 (e.g., a network interface), video display 1818, input/output device 1820, control device 1822 (e.g., a keyboard or pointing device), drive unit 1824 including a storage medium 1826, and signal generation device 1830 that are communicatively connected to a bus 1816. The bus 1816 is illustrated as an abstraction that represents one or more physical buses or point-to-point connections that are connected by appropriate bridges, adapters, or controllers. The bus 1816, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), an inter-integrated circuit ($I^2C$) bus, or an Institute of Electrical and Electronics Engineers (IEEE) standard 1394 bus (also referred to as "Firewire").

The processing system 1800 may share a similar processor architecture as that of a desktop computer, tablet computer, mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 1800.

While the main memory 1806, non-volatile memory 1810, and storage medium 1826 are shown to be a single medium, the terms "machine-readable medium" and "storage medium" should be taken to include a single medium or multiple media (e.g., a centralized/distributed database and/or associated caches and servers) that store one or more sets of instructions 1828. The terms "machine-readable medium" and "storage medium" shall also be taken to include any medium that is capable of storing, encoding, or carrying a set of instructions for execution by the processing system 1800.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1804, 1808, 1828) set at various times in various memory and storage devices in an electronic device. When read and executed by the processors 1802, the instruction(s) cause the processing system 1800 to perform operations to execute elements involving the various aspects of the present disclosure.

Moreover, while embodiments have been described in the context of fully functioning electronic devices, those skilled in the art will appreciate that some aspects of the technology are capable of being distributed as a program product in a variety of forms. The present disclosure applies regardless of the particular type of machine- or computer-readable media used to effect distribution.

Further examples of machine- and computer-readable media include recordable-type media, such as volatile memory, non-volatile memory 1810, removable disks, hard disk drives (HDDs), and optical disks (e.g., compact disc read-only memory (CD-ROMs) and Digital Versatile Discs (DVDs)), and transmission-type media, such as digital communication links and analog communication links.

The network adapter 1812 enables the processing system 1800 to mediate data in a network 1814 with an entity that is external to the processing system 1800 through any communication protocol supported by the processing system 1800 and the external entity. The network adapter 1812 can include a network adaptor card, a wireless network interface card, a router, an access point, a wireless router, a switch, a multilayer switch, a protocol converter, a gateway, a bridge, a bridge router, a hub, a digital media receiver, a repeater, or any combination thereof.

The network adapter 1812 may include a firewall that governs and/or manages permission to access/proxy data in a network. The firewall may also track varying levels of trust between different machines and/or applications. The firewall can be any number of modules having any combination of hardware, firmware, or software components able to enforce a predetermined set of access rights between a set of machines and applications, machines and machines, or applications and applications (e.g., to regulate the flow of traffic and resource sharing between these entities). The firewall may additionally manage and/or have access to an access control list that details permissions including the access and operation rights of an object by an individual, a machine, or an application, and the circumstances under which the permission rights stand.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method comprising:
   obtaining an email that is addressed to a first email account associated with a first enterprise;
   establishing that the email represents an instance of outreach by a second email account associated with a vendor for payment of an invoice by the first enterprise;
   obtaining a metric that is indicative of a risk in communicating with the second email account based at least in part on a comparison of the email to a set of emails that are representative of past instances of outreach by the second email account, at least in part by accessing a digital profile associated with the vendor, wherein the digital profile is a first digital profile included in a set of digital profiles collectively associated with a plurality of vendors, wherein the first digital profile includes a classification indicative of correspondence risk and information regarding how the classification was determined, wherein at least one email included in the set of emails is an outreach by the second email account to an email account associated with a second enterprise that is different from the first enterprise; and
   determining, based on the metric, how to handle the obtained email.

2. The method of claim 1, wherein said establishing comprises:
   determining that the email is sent from an email address with a domain that is associated with the vendor; and
   determining that the email contains the invoice based on an analysis of content of the email.

3. The method of claim 1, wherein when the metric indicates that the risk in communicating with the second email account is high, said determining comprises:
   implementing a filter so as to at least temporarily prohibit incoming emails from the second email account from being received by employees of the first enterprise.

4. The method of claim 1, wherein when the metric indicates that the risk in communicating with the second email account is high, said determining comprises:
   causing display of a notification by a computer program that includes information regarding the instance of outreach by the second email account.

5. The method of claim 4, wherein the information includes a first email address of the first email account, a second email address of the second email account, a time at which the email was transmitted, a geographical location from which the email was transmitted, an Internet Protocol (IP) address from which the email was transmitted, or any combination thereof.

6. The method of claim 1, wherein when the metric indicates that the risk in communicating with the second email account is low, said determining comprises:
   allowing the email to reach an inbox of the first email account.

7. The method of claim 1, further comprising:
   applying a first maliciousness model to the email to produce a first output indicative of whether the email is representative of a non-malicious email;
   establishing, based on the first output, that the email is representative of a malicious email; and
   applying a second maliciousness model to the email to produce a second output indicative of whether the email is representative of a given type of malicious email;
   wherein said determining is further based on the first output and/or the second output.

8. A non-transitory medium with instructions stored thereon that, when executed by a processor of a computing device, cause the computing device to perform operations comprising:
   obtaining an email that is addressed to a first email account associated with a first enterprise;

establishing that the email represents an instance of outreach by a second email account associated with a vendor for payment of an invoice by the first enterprise;

obtaining a metric that is indicative of a risk in communicating with the second email account based at least in part on a comparison of the email to a set of emails that are representative of past instances of outreach by the second email account, at least in part by accessing a digital profile associated with the vendor, wherein the digital profile is a first digital profile included in a set of digital profiles collectively associated with a plurality of vendors, wherein the first digital profile includes a classification indicative of correspondence risk and information regarding how the classification was determined, wherein at least one email included in the set of emails is an outreach by the second email account to an email account associated with a second enterprise that is different from the first enterprise; and determining, based on the metric, how to handle the obtained email.

9. The non-transitory medium of claim 8, wherein said establishing comprises:

determining that the email is sent from an email address with a domain that is associated with the vendor; and determining that the email contains the invoice based on an analysis of the content of the email.

10. The non-transitory medium of claim 8, wherein when the metric indicates that the risk in communicating with the second email account is high, said determining comprises: implementing a filter so as to at least temporarily prohibit incoming emails from the second email account from being received by employees of the first enterprise.

11. The non-transitory medium of claim 8, wherein when the metric indicates that the risk in communicating with the second email account is high, said determining comprises: causing display of a notification by a computer program that includes information regarding the instance of outreach by the second email account.

12. The non-transitory medium of claim 11, wherein the information includes a first email address of the first email account, a second email address of the second email account, a time at which the email was transmitted, a geographical location from which the email was transmitted, an Internet Protocol (IP) address from which the email was transmitted, or any combination thereof.

13. The non-transitory medium of claim 8, wherein when the metric indicates that the risk in communicating with the second email account is low, said determining comprises: allowing the email to reach an inbox of the first email account.

14. The non-transitory medium of claim 8, wherein the instructions further cause the computing device to perform operations comprising:

applying a first maliciousness model to the email to produce a first output indicative of whether the email is representative of a non-malicious email;

establishing, based on the first output, that the email is representative of a malicious email; and applying a second maliciousness model to the email to produce a second output indicative of whether the email is representative of a given type of malicious email;

wherein said determining is further based on the first output and/or the second output.

15. A system comprising:

a processor configured to:

obtain an email that is addressed to a first email account associated with a first enterprise;

establish that the email represents an instance of outreach by a second email account associated with a vendor for payment of an invoice by the first enterprise;

obtain a metric that is indicative of a risk in communicating with the second email account based at least in part on a comparison of the obtained email to a set of emails that are representative of past instances of outreach by the second email account, at least in part by accessing a digital profile associated with the vendor, wherein the digital profile is a first digital profile included in a set of digital profiles collectively associated with a plurality of vendors, wherein the first digital profile includes a classification indicative of correspondence risk and information regarding how the classification was determined, wherein at least one email included in the set of emails used in the comparison is an outreach by the second email account to an email account associated with a second enterprise that is different from the first enterprise; and determine, based on the metric, how to handle the obtained email; and a memory coupled to the processor and configured to provide the processor with instructions.

16. The system of claim 15, wherein said establishing comprises:

determining that the email is sent from an email address with a domain that is associated with the vendor; and determining that the email contains the invoice based on an analysis of content of the email.

17. The system of claim 15, wherein when the metric indicates that the risk in communicating with the second email account is high, said determining comprises:

implementing a filter so as to at least temporarily prohibit incoming emails from the second email account from being received by employees of the first enterprise.

18. The system of claim 15, wherein when the metric indicates that the risk in communicating with the second email account is high, said determining comprises:

causing display of a notification by a computer program that includes information regarding the instance of outreach by the second email account.

19. The system of claim 18, wherein the information includes a first email address of the first email account, a second email address of the second email account, a time at which the email was transmitted, a geographical location from which the email was transmitted, an Internet Protocol (IP) address from which the email was transmitted, or any combination thereof.

20. The system of claim 15, wherein when the metric indicates that the risk in communicating with the second email account is low, said determining comprises:

allowing the email to reach an inbox of the first email account.

21. The system of claim 15, wherein the processor is further configured to:

apply a first maliciousness model to the email to produce a first output indicative of whether the email is representative of a non-malicious email;

establish, based on the first output, that the email is representative of a malicious email; and apply a second maliciousness model to the email to produce a second output indicative of whether the email is representative of a given type of malicious email;

wherein said determining is further based on the first output and/or the second output.

* * * * *

UNITED STATES PATENT AND TRADEMARK OFFICE
CERTIFICATE OF CORRECTION

| | | |
|---|---|---|
| PATENT NO. | : 11,470,108 B2 | |
| APPLICATION NO. | : 17/239152 | |
| DATED | : October 11, 2022 | |
| INVENTOR(S) | : Yu Zhou Lee et al. | |

It is certified that error appears in the above-identified patent and that said Letters Patent is hereby corrected as shown below:

On the Title Page

In page 3, Column 2, item [56], Line 3, delete "Miahjajan, Sonal, et al.," and insert --Mahajan, Sonal, et al.,--, therefor.

Signed and Sealed this
Thirteenth Day of June, 2023

Katherine Kelly Vidal
*Director of the United States Patent and Trademark Office*